United States Patent
Saha et al.

(10) Patent No.: US 11,748,431 B2
(45) Date of Patent: Sep. 5, 2023

(54) SYSTEM AND GRAPHICAL USER INTERFACE FOR GENERATING DOCUMENT SPACE RECOMMENDATIONS FOR AN EVENT FEED OF A CONTENT COLLABORATION PLATFORM

(71) Applicants: Atlassian Pty Ltd., Sydney (AU); Atlassian US, Inc., San Francisco, CA (US)

(72) Inventors: Rudra Saha, Jersey City, NJ (US); Swati Katta, Mountain View, CA (US); Henry Jetmundsen, Seattle, WA (US); Ali Dasdan, Mountain View, CA (US); Timothy Clipsham, Sydney (AU); Balazs Nagy, Mountain View, CA (US); Shawn Cao, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/957,718

(22) Filed: Sep. 30, 2022

(65) Prior Publication Data
US 2023/0205833 A1    Jun. 29, 2023

Related U.S. Application Data

(63) Continuation-in-part of application No. 17/561,634, filed on Dec. 23, 2021.

(51) Int. Cl.
| G06F 16/9538 | (2019.01) |
| G06F 16/9535 | (2019.01) |
| G06F 16/9536 | (2019.01) |
| G06F 16/93 | (2019.01) |

(52) U.S. Cl.
CPC ......... *G06F 16/9538* (2019.01); *G06F 16/93* (2019.01); *G06F 16/9535* (2019.01); *G06F 16/9536* (2019.01)

(58) Field of Classification Search
CPC .. G06F 16/93; G06F 16/9535; G06F 16/9536; G06F 16/9538
See application file for complete search history.

*Primary Examiner* — Seth A Silverman
(74) *Attorney, Agent, or Firm* — Brownstein Hyatt Farber Schreck, LLP

(57) ABSTRACT

A method for recommending feed sources in an event feed includes generating an event feed comprising a plurality of feed items associated with a user. The event feed includes a recommendation feed item comprising one or more feed item sources, which may include a document space not currently followed by the user. The method further includes causing at least a portion of the event feed to be displayed to the user in the event feed. In accordance with a determination that the user is viewing a graphical user interface associated with a first software application, the recommendation feed item includes feed item sources associated with the first software application. In accordance with a determination that the user is viewing a graphical user interface associated with a second software application different from the first, the recommendation feed item includes feed item sources associated with the second software application.

20 Claims, 16 Drawing Sheets

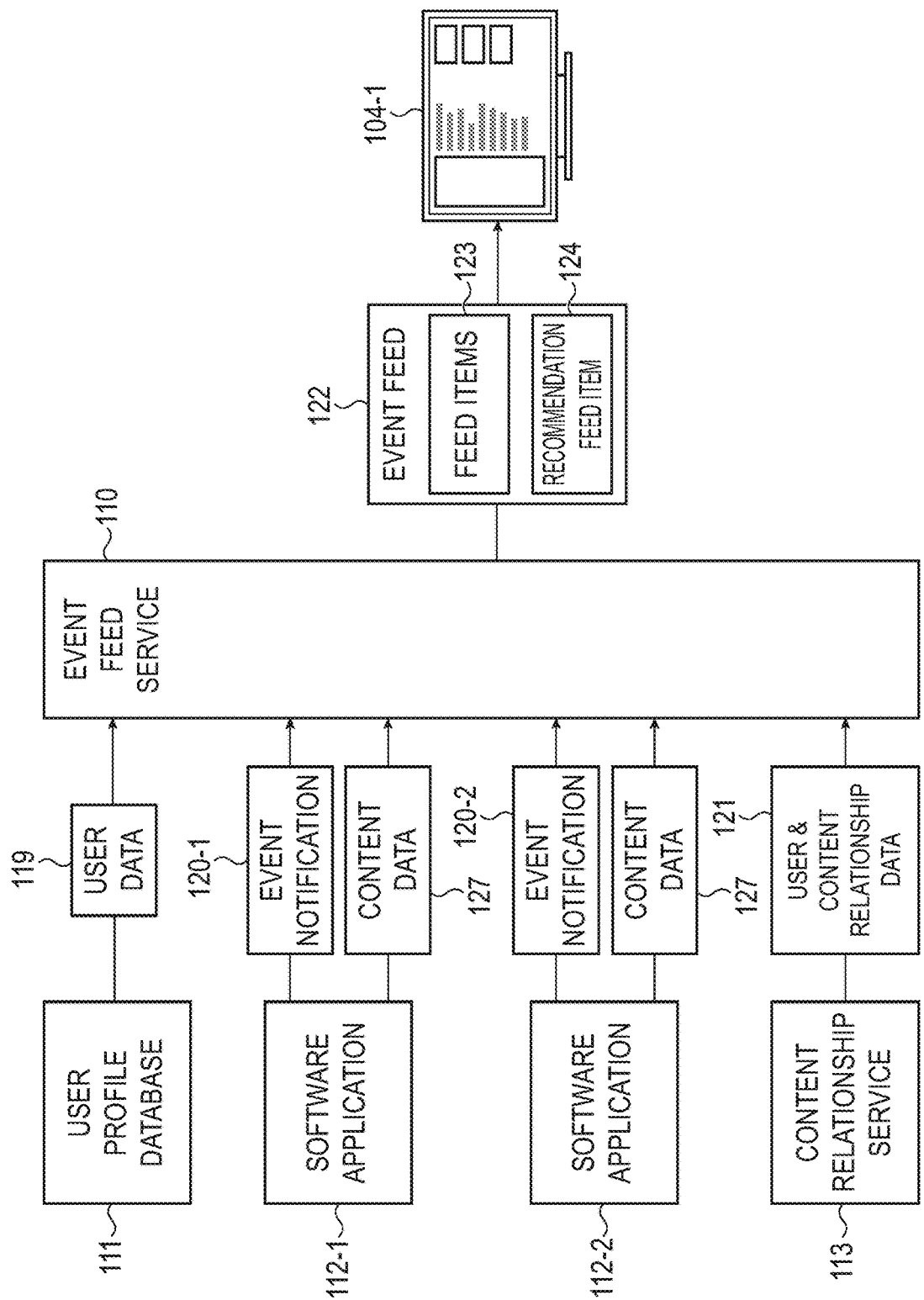

SYSTEM AND GRAPHICAL USER INTERFACE FOR GENERATING DOCUMENT SPACE RECOMMENDATIONS FOR AN EVENT FEED OF A CONTENT COLLABORATION PLATFORM

CROSS-REFERENCE TO RELATED APPLICATION(S)

This application is a continuation-in-part patent application of U.S. patent application Ser. No. 17/561,634, filed Dec. 23, 2021 and titled "Feed Recommendations for Multi-Platform Event Feeds," the disclosure of which is hereby incorporated herein by reference in its entirety.

TECHNICAL FIELD

The present disclosure is generally directed to event feeds that may be displayed to a user, and, more specifically, to systems and methods for providing recommendations of document space sources to users.

BACKGROUND

Modern electronic devices facilitate a myriad of uses, both for business and personal endeavors. For example, electronic devices like personal computers, tablets, and mobile phones, are used in both business and personal contexts for creating and storing documents, writing computer code, communicating with other individuals (e.g., via email, chat services, voice and video calls, etc.), and the like. Some modern enterprises use software systems to manage various digital items that are used for product development or other professional activities. However, for large organizations, it can be difficult to track and act on all of the digital items that may be created and/or updated over a period of time. The systems and techniques described herein can be used manage updates and new content creation by tracking system interaction events and other system activity.

SUMMARY

Embodiments described herein are directed to systems and techniques for generating recommendation feed items for a content collaborative document system, also referred to herein as a content collaboration system or platform. Some example embodiments are directed to a computer-implemented method for recommending feed sources in an event feed. At an event feed service in communication with a collaborative document system, the system may generate an event feed comprising a plurality of feed items associated with a first user. The generation of an event feed may include, for example, generating a first feed item associated with a user-generated document being followed by the first user. The user-generated document may be stored in association with the collaborative document system. The system may also generate a second feed item associated with a second user followed by the first user. The system may generate a recommendation feed item comprising one or more feed item sources not being followed by the first user. The recommendation feed item may include a recommendation to follow a recommended document space managed by the collaborative document system. The recommended document space is selected from a group of multiple document spaces managed by the collaborative document system based on a user-to-space classifier computed based on past interactions between the user and the recommended document space. Each space of the group of multiple document spaces includes: a set of documents having a first hierarchical relationship to each other defined by a document tree; a set of blog posts having a second hierarchical relationship to each other defined by a blog tree; and a space administrator identifying a user account, the user account having permission to determine permissions for the set of documents and the set of blog posts with respect to users of the collaborative document system.

Some example embodiments are directed to a computer-implemented method of generating a recommended feed item for an event feed. A first user-to-space classifier may be determined for a first user account and a first document space. The first user-to-space classifier may be based on a first set of user interaction events with respect to the first user account and the first document space. A second user-to-space classifier may be determined for the first user account and a second document space. The second user-to-space classifier may be based on a second set of user interactions events with respect to the second account and the second document space. In response to the first user-to-space classifier satisfying a classifier criteria, the system may generate a first recommendation feed item including a recommendation to follow the first document space. In response to the second user-to-space classifier satisfying the classifier criteria, the system may generate a second recommendation feed item including a recommendation to follow the second document space. At an event feed service in communication with a collaborative document system, the system may generate the event feed comprising a plurality of feed items including: a first feed item associated with a first user-generated document being followed by the first user account; a second feed item associated with a second user account followed by the first user account; and a recommendation feed item comprising one or more of the first recommendation feed item or the second recommendation feed item. The system may cause display of the event feed in a graphical user interface of a client device associated with the first user account.

Some example embodiments are directed to a feed recommendation service executing on a host server. The feed recommendation service comprising computer-executable instructions that when executed by the host server are configured to cause the host server to perform a series of operations. The operations include determining a user-to-space classifier for a user account and a first document space. The user-to-space classifier is based on a set of user interaction events with respect to the user account and the first document space. The set of user interaction events comprising: page creation events within the first document space by a user associated with the user account; page update events within the document space by the user associated with the user account; and page view events for pages within the document space viewed by the user associated with the user account. In accordance with the user-to-space classifier satisfying a space recommendation criteria, the operations include generating a space recommendation card for an event feed. The operations further include determining a relevance condition of a page with respect to the user account, the page belonging to a second document space different than the first document space. In accordance with the relevance condition satisfying a relevance criteria, the operations include generating a page recommendation card for the event feed. The instructions may also cause display of a recommendation tile in a graphical user interface of a client device associated with the user account. The recommendation tile may include the space recommendation card and the page recommendation card.

BRIEF DESCRIPTION OF THE DRAWINGS

In the drawings:

FIG. 1B depicts an example operation of an event feed service that generates event feeds and recommends feed item sources for a user.

FIGS. 2A-2C depict example event feeds displayed in graphical user interfaces of software applications.

FIGS. 5A-5C depict example recommendation feed items displayed in event feeds in graphical user interface of software applications.

Figure 1A:
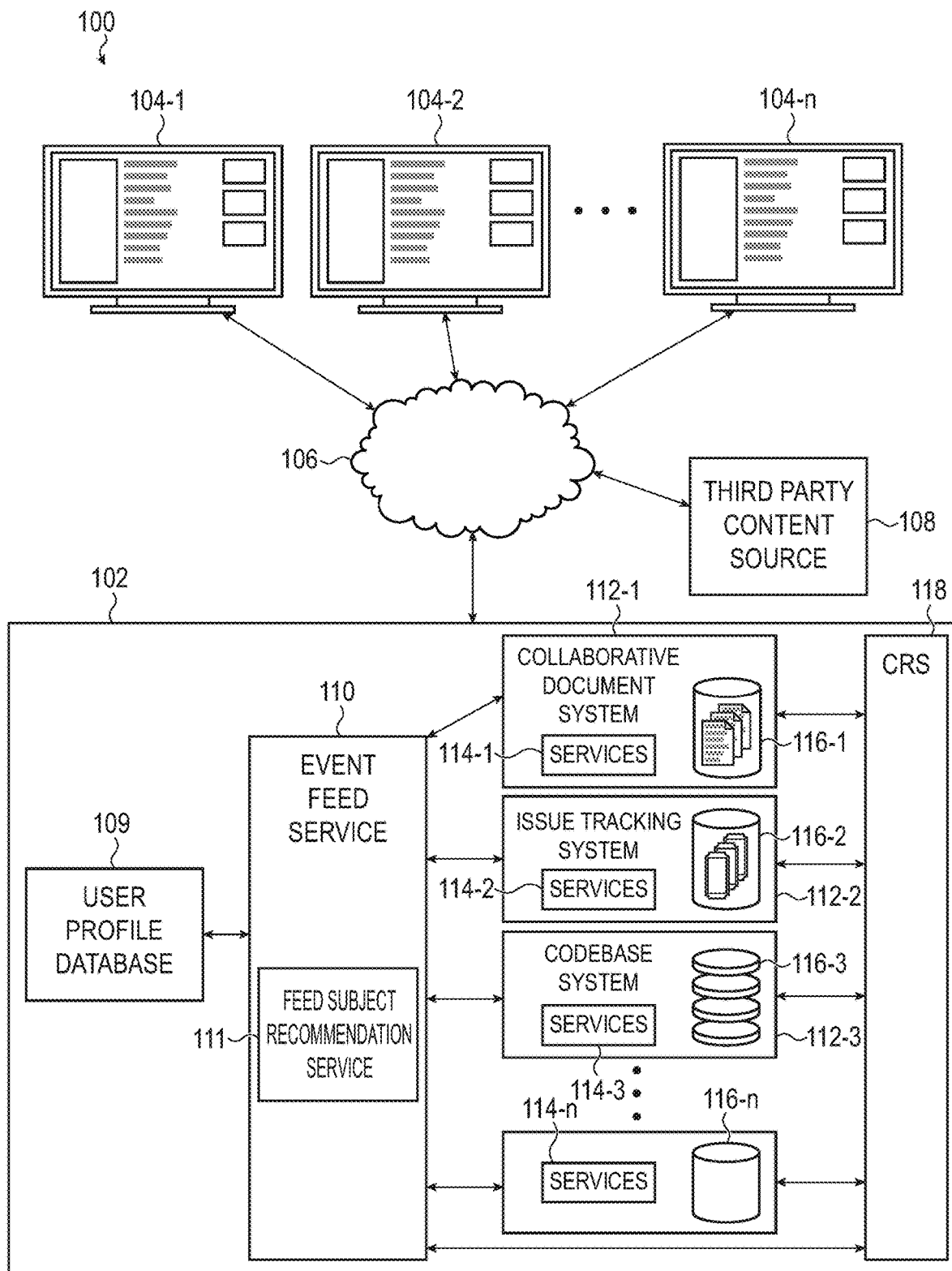
FIG. 1A depicts an example networked computer system in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claims. It will be apparent, however, that the claims may be practiced without these specific details. In some instances, well-known structures and devices are shown in block diagram form in order to avoid unnecessary obscuring.

The systems and techniques described herein are directed to a collaborative document system having an event feed that is constructed to provide feed items that are predicted to be relevant to the user. In particular, the collaborative document system may define a set of document spaces, each document space having a hierarchical arrangement of documents or pages and a hierarchical arrangement of blog posts or other user postings. The document space may also include a space calendar, space overview, and other space content items. Each document space also includes a designated space administrator identifying a user account that is granted permissions to determine or modify permissions for all of the documents, pages, blog entries, and other space content items. The systems and techniques described herein may be used to recommend a particular document space to a user based on a user-to-space classifier. The recommendation may be presented in a card of a series of cards in a feed tile that is arranged with other feed tiles generated in accordance with system events. By selecting the appropriate card, a user may be automatically subscribed to an event feed for the respective document space. Through the event feed, select events may be presented to the user and further action may be taken through the collaborative document system to act on the select events.

The present disclosure is also directed to systems and methods for providing event feeds to users across multiple software applications and computer environments, while also providing recommendations of new feed item sources that are contextually relevant to the particular application environment or application in which the recommendations are being provided. For example, an event feed as described herein may be displayed to a user in conjunction with multiple different application environments. The appearance and/or content of the user's event feed, including what feed item sources are recommended to the user, may differ based on the particular application environment that the user is engaging with. For example, if the user is engaging with a graphical user interface (GUI) of a collaborative document system, the user's event feed may show feed items relating to documents in the collaborative document system in a higher position in the feed order than other feed items. If the user is engaging with the GUI of an issue tracking system, feed items relating to issue tickets in the issue tracking system may be shown in a higher position in the feed order than those relating to documents in the collaborative document system.

The event feed service described herein may also provide recommendations of new feed item sources to users. As used herein, feed item sources include document spaces, documents, pages, content items, users, data structures, logical entities (e.g., teams, projects, issues), or other constructs about which feed items may be generated. Feed items may relate to or provide information about events that occur with respect to document spaces, documents, pages, content items, users, data structures, logical entities, or other constructs. Thus, for example, when a user subscribes to (e.g., follows) a feed item source that is a document space, feed items associated with the space may be, for example, new documents added to the document space, changes to documents within the document space, an addition of a calendar item to the document space, an addition of an administrator to the document space, an addition of a blog post to the document space, user comments or other content added to the document space, and other modifications or updates to document space content. When a user subscribes to a feed item source that is a document, feed items associated with the document may be, for example, notifications about edits made to the document. As another example, when a user subscribes to a feed item source that is an issue ticket, feed items associated with the issue ticket may be, for example, notifications of changes in status of the issue ticket. As another example, when a user subscribes to a feed item source that is another user, feed items associated with the user may be, for example, notifications of activities of the other user (e.g., when the other user comments on or edits a documents or changes a status of an issue ticket, etc.). Feed item sources may also be referred to herein as feed sources.

As noted above, an event feed may include a recommendation feed item that displays recommended feed item sources, which a user may then select to include that feed item source in their event feed. In order to improve the relevance of the recommended feed item sources, and improve user adoption of the recommended feed item sources, the recommended feed item sources, and optionally the way in which they are presented, may also be customized based on the particular application environment in which they are provided. For example, if a user is engaging with a collaborative document system, the event feed service may select recommendations that are related to user-generated documents in the collaborative document system, or users who are associated with a document that the user is actively viewing in the collaborative document system. If the user is engaging with an issue tracking system, however, the event feed service may select (for inclusion into that same user's event feed) recommendations that are related to issue tickets in the issue tracking system, or users who are associated with an issue ticket that the user is actively viewing.

As described herein, a recommendation feed item may also include a recommendation to follow a document space. A recommended document space may be selected from a group of multiple document spaces managed by the system based on a user-to-space classifier that was computed by the system. In some cases, each user may have a set of user-to-space classifiers that are computed, each user-to-space classifier computed or determined with respect to a particular document space. The user-to-space classifier may be computed based on a set of user interaction events that have been observed and/or stored by the system. The user interaction events may be classified and different classes of interaction events may be weighed differently in order to improve the prediction accuracy of the document space recommendation. In some cases, the system uses a machine-learning trained model to predict or evaluate user-to-space classifiers. The machine-learning trained model may be trained using existing user classifiers and for users that are following respective document spaces and not following other document spaces.

Generally, the event feed for a given user and a given platform may be constructed using multiple feed item sources. As used herein, the term "feed item sources" may be used to refer to a source of event feed items for inclusion in an event feed. Feed item sources may be associated with content or a subject. As one example, a feed item source may be content such as a document space, a user-generated document, a page, an issue ticket, or a source code management system. In such cases, events that occur with respect to such content may be the subject of event feed items. For example, feed items may be generated in response to an edit being made to a document, or a change in status of an issue ticket, or a code commit in a codebase (e.g., to provide information about the event to an interested user). As another example, a feed item source may be a subject such as a project name. In such cases, events that occur with respect to the project may be the subject of event feed items. For example, a feed item may be generated in response an edit being made to a document related to the project, a change in status of an issue ticket related to the project, or the like. Feed item sources may also be individual users or groups of users. Notably, feed item sources are not limited to individual content items, but instead may include any entity or combination of entities in the networked computer system, whether assigned or created by a user, or automatically identified by the system (including, without limitation, users, subjects, content items, documents, issue tickets, codebases, teams, employment statuses or job titles, and software applications).

The recommendations provided to a user in an event feed may be presented in a single feed item, but may include various different types of feed item sources. For example, a feed item may include multiple "tiles" or other selectable elements in a single region, and the tiles may be associated with different types of feed item sources, such as other users, documents, issues and/or issue tickets, codebases, or the like. Thus, the contents of a recommendation feed item can be highly customized to the user, can be customized to the application environment that the user is working in, and can provide recommendations of highly diverse feed item sources. These and other features may improve the likelihood that the recommendations are relevant to a user and improves the likelihood that a user will select recommended feed item sources for inclusion into their event feed.

These and other features of an event feed service are described herein. While certain example application environments are used to illustrate the features of the event feed service, these are provided for example purposes only. Indeed, the event feed services described herein may generate feed items for, recommend feed item sources from, and display event feeds in numerous different types of software applications and/or services, including but not limited to messaging applications (e.g., instant message applications, email applications, group-messaging applications, etc.), wiki applications, sales management applications, project management applications, source code control applications (e.g., for managing, creating, and/or editing source code for computer programs, websites, etc.), human resources applications, or the like.

FIG. 1A depicts an example networked computer system 100 (or simply "system 100") in which the techniques described herein may be employed. The system 100 includes an application platform 102, third party content sources 108, and client devices 104 (104-1, . . . , 104-n) that communicate via a network 106 (e.g., the Internet). The client devices 104 may be any suitable type of device, including but not limited to a desktop or laptop computer, tablet computer, mobile phone, personal digital assistant, smart device, voice-based digital assistant, or the like.

The application platform 102, also referred to herein as hosted services or host servers, may be or may include one or more servers, content stores (e.g., databases), communications systems, data structures, programs, or other components, systems, or subsystems that provide services described herein, including event feed services. The application platform 102 may also be referred to herein as hosted services, which may be provided by one or more host servers or other hardware elements of the system 100. The application platform 102 may include an event feed service 110, one or more software applications 112 (e.g., 112-1, . . . , 112-n), a user profile database 109, and a content relationship service 118. The one or more software applications 112 provide content and content services to users of the system 100, as described herein. The event feed service 110 may generate event feeds, and may send and receive information relating to the event feeds among the software applications 112 and client devices 104 of the system 100.

The software applications 112 may include application services 114 (e.g., 114-1, . . . , 114-n) and data stores 116 (e.g., 116-1, . . . , 116-n). Application services 114 may facilitate the creation, deletion, management, editing, serving, and/or other services related to the content and/or content items associated with that software application and stored in the data store 116. Data stores 116 may be databases or other data storage resources that store content items and/or other data related to a software application 112.

In some cases, a first software application 112-1 may be a collaborative document system or platform, which may also be referred to as a content collaboration system or platform. The collaborative document system may allow users (e.g., via clients 104) to create, modify, view, and/or otherwise interact with system content. User-generated content (e.g., content created by or designated by system users) is generally organized in what is referred to herein as a document space or simply a space. Generally, a document space includes a set of documents (or pages) having a hierarchical relationship to each other as designated by a document tree (or page tree) and also a set of blog entries (or other entries) having a hierarchical relationship to each other as designated by a blog tree. Document spaces generally include other content including a calendar, a space home page or overview, a space calendar, and other space-specific content. Document spaces may also include in-line comments, comment sections for each document or page, and other content that is adapted to receive and collect user feedback. Further, each document space designates at least one space administrator, which identifies a user account on the system having administrator authority and permissions. Specifically, a user account designated as a space administrator is granted the permission to set permissions for space-specific content including the set of documents (or pages), the set of blog entries, calendar entries, space overview, and other space content with respect to other system users. While there may be more than one space administrator, the authority to set permissions for a given space is generally not exceeded by another system user other than a tenant-level administrator or other special user account. In many cases, the space administrator is the creator or author of the document space.

The space content including electronic documents, electronic pages, blog posts, calendar entries and other content may be stored in the data store 116-1. User-generated content may include content such as text, images, graphics, tables, or the like. Documents may be linked or otherwise related to one another in a document hierarchy as designated by a hierarchical element tree (e.g., a document tree or a page tree). Documents (e.g., user-generated documents) may be stored in the data store 116-1 as discrete files, data structures, or other digital objects. The data store 116-1 may be a centralized or single physical data storage medium or, alternatively, may be distributed across physical memory managed by multiple devices.

The application services 114-1 of the collaborative document system may facilitate content services related to the documents, including causing user interfaces of the collaborative document system to be displayed to a user on a client 104, receiving user inputs relating to the creation and/or modification of documents, and the like. The application services 114-1 may also send to the event feed service 110 notifications of events relating to user-generated documents stored in the data store 116-1, as described herein.

A second software application 112-2 may be an issue tracking system that tracks issues via issue tickets, which may be stored in the data store 116-2. Issue tickets may include content, such as a user-generated description of an issue, issue status (e.g., closed, open, awaiting review), user assignments, issue ticket urgency, issue ticket age, and the like. In some cases, issue tickets may include user-generated specifications of issues in computer code of software products.

Issue tickets may be stored in the data store 116-2 as files, data structures, or the like. The application services 114-2 of the issue tracking system may facilitate content services related to the issue tickets, including causing user interfaces of the issue tracking system to be displayed to a user on a client 104, receiving user inputs relating to the creation and/or modification of issue tickets (e.g., changing status, receiving content related to the issue and/or issue resolution, etc.), changes to issue status, changes to user assignments, and the like. The application services 114-2 may also send to the event feed service 110 notifications of events relating to the issue tickets stored in the data store 116-2, as described herein.

A third software application 112-3 may be a codebase system that provides services related to creating, developing, maintaining, and/or deploying software code. The third software application may include, for example, a source code management system (SCM system), deployment management system, or other system configured to manage the storage, revision, and/or deployment of software products. Software code and other data associated with the third software application 112-3 may be stored in codebases 116-3. In some cases, code for distinct software programs, environments, platforms, or the like, may be stored in or as distinct codebases 116-3. Distinct codebases may be stored in different databases or data stores, or they may share one or more databases or data stores.

The application platform 102 may include one or more authorization services or authorization servers that are used to authenticate system users (accessing the system through client devices 104. Once authenticated, the users may be granted access to one or more of the respective software applications, platforms, and system content in accordance with a permissions scheme or profile stored with respect to each registered user account, which may be stored by or managed by the user profile database 109. Each application may have a discrete or separate authorization service or system or applications may share or leverage a common authorization service or server. In one example, the application platform 102 provides a unified authentication service by verifying access from a permitted user and pairing the verified user with a corresponding user account in one or more of the software platforms. As one non-limiting example, the authorization service or server may use a shared cookie/scheme to authenticate each user account on each software application or platform. As another non-limiting example, the authorization service or server may authenticate users with a single sign-on service (SSO) and/or a two-factor authentication (2FA) service.

One or more third party content sources 108 may also interface with the event feed service 110 to provide notifications of events for inclusion into event feeds. For example, as described herein, third party content sources 108 may send to the event feed service 110, via an application programming interface, a notification of an event, and content associated with the event. The event feed service 110 may incorporate the content into an event feed for an intended user. Similarly, the event feed service 110 may send information to the third party content source 108, via an application programming interface, based on user interactions with feed items related to the third party content source.

The software applications 112 may communicate with a content relationship service (CRS) 118. The content relationship service 118 may monitor, track, analyze, and/or store information about relationships between and among content items and users of the application platform 102. For example, the CRS 118 may monitor for and/or maintain information about which users have accessed, created, modified, commented on, viewed, or otherwise interacted with which content items in the application platform 102. In some cases, the CRS 118 monitors or tracks user activity with respect to a particular document space and may develop user-to-space classifiers, as described herein. Further, the CRS 118 may monitor for and/or maintain information about links between content items in the application platform 102. The CRS 118 may analyze the information to determine links between content items, user-generated documents, users, teams, projects, issues, issue tickets, codebases, and/or other entities of the application platform 102. As described herein, the CRS 118 may be used by the event feed service 110 to determine feed item sources to recommend to users of the application platform 102. For example, the CRS 118 may be used to identify additional users who have contributed to a user-generated document that was created by an author. That information may be used to recommend those additional users as potential feed items sources for the author of the user-generate document.

The event feed service 110 communicates with the software applications 112 and/or third party content source(s) 108 to receive notifications of events (and optionally content associated with the events). The notifications of events may be provided to the event feed service 110 according to a push protocol in which the software applications 112 send the notifications according to their own schedule (e.g., in response to an event occurring and generating a notification), or according to a fetch protocol in which the event feed service 110 requests notifications of events from the software applications.

The event feed service 110 may generate event feed items 123 (or simply feed items) and event feeds for users based on the received notifications, and send and/or provide the event feeds to client devices 104 for display to users. For example, the event feed service 110 may receive a notification of a modification to a document in a collaborative document service (e.g., the software application 112-1), and generate a feed item 123 based on the notification. The feed item 123 may include information about the document, a portion of the document's content, and one or more actionable input objects that a user can interact with to cause a change or modification to the document. The feed item 123 may be displayed to a user (e.g., on a client 104) in a manner that is customized based on factors such as the identity of the user, the software application in which the event feed is displayed, feed presentation preferences of the user, or the like. The event feed service 110 may generate feed items 123 and send the feed items 123 to the client devices 104 for display in an event feed. In some cases, the event feed service 110 generates definitions of feed items, where the definitions include an address of the underlying content item to which the feed item relates. The definition, when sent to a client device 104, may cause the client device 104 to retrieve the content item or information from the content item.

The event feed service 110 may store and manage subscriptions of users to feed item sources. For example, for each user for which the event feed service 110 generates event feeds, the event feed service 110 may maintain a list of feed item sources to which that user subscribes (e.g., follows). The list of feed item sources may be stored in a feed registry, which may be maintained for each system user having a respective event feed. The feed registry may track individual user subscriptions across multiple platforms and may serve as the central feed subscription authority for a given tenant or enterprise. When events occur with respect to those feed item sources (e.g., when notifications are received from or associated with a feed item source), the event feed service 110 may generate feed items based on those notifications, and include those feed items in the event feeds of users who have subscribed to the feed item source.

As used herein, a user subscribing to or following a feed item source may result in the user receiving feed items in their event feed related to the feed item source. Subscriptions may be stored and/or managed by the event feed service 110 as described herein. Subscribing to or following a feed item may result in all events associated with the feed item source being included in an event feed to the subscribed user, or only a subset of the events associated with the feed item source. A subscription to content such as a document may result in events that occur with respect to that content (e.g., edits, comments, changes in status, etc.) being included in the event feed of a subscribed user. A subscription to a user may result in events that occur with respect to the user being included in the event feed of a subscribed user. More particularly, any activity or action of or associated with a user with respect to content or other entities in the networked computer system 100 may be the subject of a feed item in a subscribed user's event feed. For example, a first user may have many different interactions with content in a networked computer system 100. When a second user subscribes to a first user, the activities of the first user in the networked computer system 100 may initiate feed items in the event feed of the second user, even across multiple content items, types of content, etc. Thus, for example, if the first user comments on a document, changes a status of an issue ticket, or becomes a member of a project or team, each of those events may cause a corresponding feed item to be generated and displayed to the second user.

The event feed service 110 may include a feed source recommendation service 111. The feed source recommendation service 111 (or simply recommendation service 111) may generate feed item source recommendations for users of the application platform 102. The recommendation service 111 may access information from the software applications 112, the CRS 118, a user profile database 109, and/or other sources, in order to generate feed source recommendations. The recommendation service 111 may also determine the context of a user when generating and/or selecting feed item source recommendations for a user. As used herein, the context of a user may refer to aspects about the software application and/or content with which the user is engaging. Examples of a user's include, without limitation, the software application a user is engaging with, the content a user is engaging with, an arrangement or configuration of a graphical user interface that the user is engaging with, event feed settings of a user, and the like. In one example, the recommendation service 111 may determine which software application a user of a client 104 is accessing when a recommendation feed item is requested, and generate and/or select recommendations that are uniquely relevant to that software application. As another example, the recommendation service 111 may determine what content item (e.g., a document space, issue ticket, user-generated document, codebase) a user of a client 104 is accessing when a recommendation feed item is requested, and generate and/or select recommendations that are uniquely relevant to that content item.

The feed source recommendation service 111 may also determine what feed item sources may be relevant to users in order to generate feed item source recommendations. Relevance may be determined by identifying similarities and/or links between users and feed item sources. For example, users may be associated with numerous types of data in the application platform, which may be used to define an identity data structure of the user. Data that may be included in or may define an identity data structure of the user includes, without limitation, content interaction histories, projects, teams, organization departments, documents, issues, issue tickets, codebases, files, and other entities and/or constructs that are represented in the application platform 102. Feed item sources may also be associated with identity data structures. For example, for a user-generated document (one example of a feed item source), the identity data structure may include document metadata (e.g., title, storage location, author, etc.), user interaction histories (e.g., a list of what users have engaged with the document, and the type and/or results of the engagement), etc. For an issue ticket (another example of a feed item source), the identity data structure may include issues associated with the issue ticket, a status of the issue ticket, identifiers of software to which the issue ticket pertains, the identities of reviewers of the issue ticket, etc. For users as feed item sources, the identity data structure of the user may also be used to characterize the user as a feed item source.

The feed source recommendation service 111 may use the identity data structures of the user and feed item sources to determine the relevance of the feed item sources to the user. The relevance may be represented by a relevance score, classifier, confidence value, or other metric, which may be used to estimate a predicted relevance of a given feed item source with respect to the particular user. As described herein, a classifier may be developed with respect to the user and a specific feed item source including one or more of the feed item sources described herein including, a document space, user document, page, issue. By way of example, the feed source recommendation service 111 may develop a user-to-space classifier for a given user with respect to one or more document spaces that the user has interacted with using the system 100. The user-to-space classifier may be constructed using previous user interaction events or a stored user history of interactions with respect to space content including, without limitation, number of documents or pages created by the user in a particular space, number of updates or modifications to documents or pages, a number of mentions within a particular space, a number of documents or paged viewed longer than a threshold time for the particular space, and other user interactions with respect to the particular space. In some cases, an initial classifier is normalized with respect to the space size (with respect to number of documents/pages or space content) or total number of interactions with a given space, which may allow for a better classifier-to-classifier comparison and ranking. In some cases, a trained machine-learning model is used to predict whether a given classifier indicates that a space (or other feed item source) should be recommended to a user. The machine-learning model can be trained using classifiers for existing subscribes (or users that have chosen to not subscribe). Additionally, user selection of a recommendation card or other element to subscribe or follow a particular space or other feed item source can be used as feedback for the model, which may adapt over time to use of the system and user preferences.

The recommendation service 111 may use other techniques for predicting a relevance or otherwise determining whether to recommend a particular feed item source. In some cases, the relevance may be estimated or predicted using a confidence value, as described herein. The confidence value may represent an outcome of a comparison operation between a user and a feed item source, and may be characterized by a range of values (e.g., 0-100). Other measures of relevance may also be used including, for example, a relevance score, an aggregated interaction metric, or other metric that can be used to predict relevance of a feed item source.

In some cases, the feed source recommendation service 111 also produces a reason for the recommendation. For example, the feed source recommendation service 111 may indicate that a finding of relevance between a user and a feed item source is based on a shared attribute in their respective identity data structures (e.g., a user and a document are both associated with a same project, or a user and another user interact with similar documents, etc.). In some cases, the reason may cite a class of events or system interactions that were influential in the recommendation. For example, the system may identify an influential factor in making the recommendation and generate a brief narrative regarding the factor. For example, the system may generated reason narratives such as "mentioned frequently in this space," "created documents in this space," "collaborated with this user frequently," or other similar narratives. In some cases, the system is configured to display and indica of the reason for the recommendation in the card or tile of the recommendation feed element displayed in the event feed. The indicia of the reason may include all or a portion of the reason narrative. The reason narrative may also be referred to herein as a relevance field, recommendation narrative, or recommendation indicia.

The feed source recommendation service 111 may perform operations described herein relating to generating and displaying recommendation feed items. In some cases, certain operations may be described as being performed by the event feed service 110. It will be understood that operations described as being performed by the event feed service 110 may be performed by the feed source recommendation service 111.

The event feed service 110 may also receive, from client devices 104, information about interactions with the feed items. For example, if a user interacts with an actionable input object of a feed item, information about that interaction may be sent from a client device 104 to the event feed service 110, which may then communicate that information to the relevant software application 112. As one nonlimiting example, if a user interacts with a feed item relating to an issue ticket and assigns the issue ticket to another user, the event feed service 110 may receive the information (e.g., an identifier of the issue ticket and an identifier of the new user), and provide that information to the event feed service 110 so that the underlying content item (e.g., the issue ticket) can be modified appropriately.

The event feed service 110, and/or the recommendation service 111 of the event feed service 110, may communicate with the user profile database 109 in order to generate individualized feed items, recommendation feed items, and event feeds for unique users. The user profile database 109 may store and maintain user profiles about users of the system 100. User profiles may include numerous types of information about the users of the system, including but not limited to names, departments, job titles, roles, content with which they are associated (e.g., documents, issue tickets, messages, etc.), team and/or project associations, relative position in a hierarchy in an organization or entity, or the like. The event feed service 110 may use the information in the user-profile database to determine what events should be included in a user's event feed, what feed item sources to recommend to a user, how an event feed should be displayed to the user, and the like.

While collaborative document systems, issue tracking systems, and codebase systems are used as example software applications, these are merely examples of software applications that may be used with event feed services described herein. Other types of software applications and/or content sources that may provide feed items and about which feed item source recommendations may be generated include, without limitation, messaging applications (e.g., instant message applications, email applications, group-messaging applications, etc.), wiki applications, sales management applications, project management applications, human resources applications, or the like.

FIG. 1B illustrates how the event feed service 110 may facilitate the type of enhanced functionality in event feeds that is described herein. More particularly, FIG. 1B demonstrates how the event feed service 110 generates event feeds for users and also generates and serves contextually relevant recommendations to recipients of event feeds.

For example, with respect to generating event feeds, multiple content sources, such as software applications 112, may send notifications of events (notifications 120) associated with the content sources to the event feed service 110. The notifications 120 may be triggered by an event occurring with respect to a content item associated with the software application or other content source. For example, a change in a status of an issue ticket may cause an event notification 120 to be sent to the event feed service 110 from an issue tracking system. Other examples of events that trigger an event notification 120 include, without limitation, a creation of a calendar entry in a space calendar, an addition of an administrator or other user to a document space, a new document or page being added to a document space, a modification or edit of a document or page in a document space, a comment, mention, or other user feedback to content of a document space, an edit to user-generated content, a request for an approval in respect of a content item, an upcoming deadline or due date for an action or content item, or other actions that may be performed among the software applications operably coupled to the event feed service 110. Whether an event triggers a notification 120 (or whether a notification causes a feed item to be generated) may be determined at least in part based on user interaction histories of a user. For example, if an interaction history of a user indicates that the user frequently reviews edits made to content items associated with a particular project, the content sources may send notifications related to content items associated with that project (and/or the event feed service may generate feed items for the user in response to receiving notifications relating that project).

The event feed service 110 may also receive or access data from the content sources, the user profile database 109, and/or the CRS 113, from which recommendations for feed item sources may be determined. For example, the event feed service 110 may receive or access content data 127 from the content sources, user data 119 from the user profile database 109, and user and content relationship data from the CRS 113. The event feed service 110 (and more particularly the feed source recommendation service 111) may use the data to determine and/or identify feed item sources that are relevant to a user. Relevancy to a user may be determined based on the received data, and more particularly, on associations between the user and other entities in the application platform 102 (e.g., users, projects, documents, issue tickets, issues, etc.) that are represented in the data. The event feed service 110 may analyze the data to identify such associations and thereby identify feed item sources that may be relevant to the user. A relevancy of a feed item source may be associated with and/or represented by a classifier, relevancy metric, confidence value or other metric related to the feed item source. As described previously, a classifier may be developed for a user with respect each of multiple candidate feed item sources. In another example, the event feed service 110 may receive or generate confidence values that a given entity is relevant to a given user. The relevance confidence value may be based on the data described above. For example, a confidence value for the relevance of one user to another user may be based on the similarity or overlap of the content that the two users interact with. Thus, for a first user, a second user may have a higher relevance (e.g., confidence value) to the first user than a third user if the content interaction history of the second user is more similar than that of the third user to the content interaction history of the first user. As another example, a confidence value for the relevance of a user-generated document to a first user may be based on whether other users associated with the first user have interacted with that user-generated document. Thus, for example, if a first user is associated with ten other users who have all modified a particular user-generated document, the confidence value in the relevance of that document may be high (e.g., as compared to a document that only one or two associated users have interacted with). In general, confidence values in the relevance of a feed item source to a user may be based on associations between users and content items, including factors such as the number of associations, the duration of associations, or the like.

As noted above, the recommended feed item sources may be based in part on content data 127 received or accessed by the event feed service 110. Content data 127 may be or may include data about content items associated with the content sources. Content data 127 may include, without limitation, names of content items, identifiers of individuals who are associated with content items (e.g., users who have created, modified, viewed, commented on, been assigned to, or otherwise interacted with content items), subjects with which content items are associated (e.g., projects, teams, codebases, issues, etc.), and the like. The event feed service 110 may use the content data 127 to determine feed item sources to recommend to users. The event feed service 110 may analyze the content data 127 to identify feed item sources that may be relevant to a user for which the recommendations are being generated. For example, the event feed service 110 may determine that a user for which an event feed is being provided may be associated with a user-generated document that the user is not currently following (e.g., to which the user is not subscribed), and may recommend that user-generated document as a feed item source to the user. As another example, the event feed service 110 may determine that the user is on a team with another user, and therefore recommend the other user as a feed item source. Other associations between users and feed item sources may also be used to determine and/or generate feed item recommendations.

The event feed service 110 may also receive user data 119 from the user profile database 109, and user and content relationship data 121 from the content relationship service 113. The event feed service 110 may use the user data 119 and the user and content relationship data 121 to generate recommendations. For example, the user data 119 may include information such as what teams and/or projects the users are associated with, job titles, and the like. The event feed service 110 may use this information to identify feed item sources to recommend to a user (e.g., recommend that a first user follow a second user who is on a same team as the first user).

The user and content relationship data store 121 may include relationships between content items and users, such as a record of interactions between users and content items. For example, the user and content relationship data 121 may including information about what documents, issue tickets, codebases, or other content items each user has interacted with, and details about the interaction (e.g., whether the user created, edited, modified, viewed, or commented on the content, or records of other potential interactions). The event feed service 110 may use this information to identify feed item sources to recommend to a user (e.g., recommend that a first user follow a second user whose content interaction history overlaps with or is similar to that of the first user).

The user and content relationship data store 121 may also store and manage tracking of user interaction events and other system interaction logs that are generated in response to use of the system 100. The user interaction events may include past interactions between the user and various aspects of the system including document spaces, documents, pages, blogs, issue tickets, comments, calendars, preferences or settings, permissions, and other aspects of the system. In some implementations, the user interaction events may be classified or assigned to a category of interaction, which may be used to score or quantify a user's level of interaction with a particular aspect of the system. For example, interaction events may be classified as content creation events, content editing events, content viewing events, content comment events, user mention events, content sharing events, and other types of events in which the user interacts with various content and operations of the system. In some cases, a type of event and a duration of time are used to classify events. For example, an event may be classified as a content viewing event if the respective content (e.g., a document, page, or issue ticket) is viewed by a respective user for more than a threshold amount of time or dwell time. The threshold amount of time may be greater than 5 seconds, greater than 10 seconds, and, in some cases, 11 seconds or greater. In some cases, events may be classified as being associated with content of a particular document space, as described herein. As described herein, space-specific or space-related interactions may be aggregated and used to measure or quantify a particular user's interactions with a particular space. As described herein, such aggregated activity may be used to determine a user-to-space classifier that may include a set of elements, each element corresponding to a type of interaction with the space or space content. In some cases, the user-to-space classifier may be represented as a vector having a set of vector elements. The vector may be normalized or weighted in order to facilitate comparison across system users and/or improve the prediction accuracy of the metric. Such classifiers and other metrics may be computed and stored by the content relationship data store 212, the content relationship service 113 the event feed service 110, or other component of the system 100.

The event feed service 110 may use the user data 119, content data 127, and/or user and content relationship data 121 to generate recommendation feed items 124. Recommendation feed items 124 may be displayed in an event feed, and may be similar in appearance (e.g., size, shape, position, etc.) to other feed items 123 in an event feed. The graphical representation of feed items and recommendation feed items may be referred to as tiles. Recommendation feed items 124 include one or multiple cards within a tile and representing feed item sources that a user can choose to follow. The cards may each provide information about the feed item sources and one or more selectable elements that a user can select in order to add the feed item to their event feed. The information in the cards may include, without limitation, a name and/or image (e.g., photograph or representative icon) of the feed item source being recommended, and/or a reason that the feed item source is being recommended. The cards may also include an option to dismiss the recommendation (either permanently or for a period of time). In some cases, the cards may include an option to reject or dismiss the reason that a feed item source was recommended. For example, if a card states that a reason a source was recommended due to the user's association with a particular project, the user may be able to reject that reason, which may prevent the event feed service 110 from recommending sources for that reason in the future.

Further, as described herein, the event feed service 110 may recommend different feed item sources based on the application environment with which the user is engaging and in which the event feed is to be displayed. For example, if the user is engaging with a collaborative document system, the event feed service 110 may select feed item source recommendations that relate to documents in the collaborative document system, or other individuals who interact with the same or similar documents in the collaborative document system as the user. As another example, if the user is engaging with an issue tracking system, the event feed service 110 may select feed item source recommendations that relate to issue tickets in the issue tracking system, or other individuals who interact with the same or similar issue tickets in the issue tracking system as the user. As yet another example, if the user is engaging with a codebase system, the event feed service 110 may select feed item source recommendations that relate to codebases or source code files in the codebase system, or other individuals who interact with the same or similar codebases or source code files in the codebase system as the user. The event feed service 110 may also select feed item source recommendations based on the content with which the user is engaging when the recommendation is displayed. For example, if a user is viewing a document in a collaborative document system or viewing content in a particular document space, the event feed service 110 may select feed item sources related to that document space, or that particular document (e.g., other users who have accessed or interacted with that document), other documents related to the document being viewed, projects related to the document being viewed, or the like.

Returning to the operations for generating event feeds, the notifications 120 may include information about the event, such as a textual description of the event, a code indicating the event, or the like. The notifications 120 may also include information related to the content item associated with the event. For example, information related to the content item may include an identifier of the content item (e.g., an address, a URL, a unique identifier of the content item in the content source, a file name, etc.), content from the content item (e.g., a portion of textual, graphical, or other content from the content item), metadata or attributes associated with the content item (e.g., an author of the content item, a title of the content item, a type or category of the content item), user inputs associated with the content item (e.g., user inputs that may be included as actionable input objects in event feed items), or the like. In some cases, an event notification 120 may include a complete specification of a feed item associated with an event.

The notifications 120 may also include information that may be used to prioritize or rank feed items in a user's feed. For example, notifications 120 may include a date on which an action item is due or is requested to be completed. A feed item corresponding to that notification may be ranked and/or prioritized in a user's event feed based on that date. For example, if the date is not imminent, the feed item may be positioned lower in the event feed. If the date is imminent, the feed item may be positioned higher in the event feed. In some cases, if a due date or requested-by date is imminent, it may re-appear in the event feed so that the user encounters the feed item multiple times as they scroll through their event feed (or as the event feed otherwise advances or displays new feed items). The imminency of a due date or requested-by date may be based in part on a timeline or duration associated with the task. For example, the task is one that is generally accomplished quickly (e.g., approving a closure of an issue ticket, assigning an issue ticket to a user), a feed item associated with that task may be considered imminent when the due date or request-by date is within one day (or less, such as within 6 hours). If the task is one that generally takes a longer time to complete (e.g., reviewing user-generated content or edits to a document, reviewing changes to a codebase), the feed item associated with that task may be considered imminent when the due date or request-by date is within one week (or any other suitable time line). The event feed service 110 may store data regarding the estimated time to complete certain tasks that may be the subject of feed items, and may use the estimated times along with the date information included in a notification 120 to determine how to rank and/or display feed items in an event feed.

Once a due date or request-by date has passed, the feed item for that content item may be persistently displayed in the user's event feed, such as at the top of the list in the feed. In some cases, past-due feed items cannot be scrolled off of the feed or otherwise removed from display until they are completed. As another example, past-due feed items may be muted or snoozed for a period of time, but they may continue to be displayed to the user at intervals until they are completed.

A notification 120 may also include an urgency indicator. An urgency indicator may be user-selectable, or may be selected based on a type of event that triggered the notification. Urgency indicators may indicate a relative urgency of a task or notification, without necessarily including a due date or requested-by date. Urgency indicators may include a limited set of options. For example, the urgency of an event may be selected from high urgency, normal urgency, or low urgency. As another example, urgency may be scaled from 1-10 (with 10 corresponding to the highest urgency). The event feed service 110 may use the urgency indicator to determine how, where, and/or how frequently the associated feed item is displayed to the user. For example, high urgency feed items may be shown to a user more frequently or may be shown higher in the feed order than normal or low urgency items. In some cases, the urgency of a feed item may be determined by the event feed service 110 (e.g., without a user-specified urgency) based on factors such as the software application to which the feed item relates, whether the feed item includes an actionable input object or otherwise requires or prompts the user to take some action, an urgency of a project or task to which a feed item relates, or the like.

The appearance of feed items may also be dependent in part on the urgency or imminence of the feed item. For example, feed items with a high urgency or imminence may be shown in a different color as other feed items, or have a distinctive border or other graphical component that visually differentiates the more urgent or imminent feed items from other feed items.

Notifications 120 may be provided from multiple content sources, such as software applications 112, where the content sources may be associated with different types of content and/or different types of content services. As described above, the software applications 112 may be part of the same application platform 102 as the event feed service 110. In such cases, the software applications 112 and the event feed service 110 may both be capable of accessing the same content items. Accordingly, the notifications 120 may include references to content items in place of actual content from the content items. This may reduce the size and complexity of the notifications 120 and may result in greater efficiencies in the application platform 102. The notifications 120 may be formulated as application programming interface (API) calls.

Third party content sources 108 may also provide information to the event feed service 110 to be included in an event feed. Such information from third party content sources 108 may be formulated as API calls, and may be referred to as event feed item API calls. The event feed item API calls may include the same or similar information as the notifications 120, as described above. In some cases, the API calls also include a specification for the feed item that is to be generated based on the API call. The specification may specify parameters such as appearance, graphical layout, icons or other graphical objects to be displayed, textual content to be included in the feed item, and the like.

The event feed service 110 receives the event notifications 120 from content sources (e.g., software applications 112) and the API calls from third-party sources and generates feed items based on the notifications. The feed items may be generated based on the information in the event notifications 120 and the API calls, as well as content retrieved from other sources. For example, the event feed service 110 may receive a notification 120 that includes a reference to a content item (e.g., an address or file name), and the event feed service 110 may communicate with a data store (e.g., a data store 116) to retrieve the content item or information from the content item for inclusion into a feed item.

Upon request from a client device 104-1 (e.g., from an application executed on the client device 104-1), the event feed service 110 may generate an event feed and provide the event feed to the client device 104-1. The event feed may be generated specifically for the user associated with the client device 104-1. For example, the event feed may include feed items that are relevant to the user. Relevancy to a user may be based on various factors, such as whether the user is explicitly identified in the feed item, whether the feed item relates to a content item for which the user is an author or contributor, whether the feed item relates to an organizational role of the user, whether the user has interacted with similar feed items in the past, whether the user's input is required by the content item, or the like.

When certain conditions are satisfied, the event feed service 110 may generate and or include a recommendation feed item in an event feed to a client device 104. Conditions that trigger or otherwise cause the event feed service 110 to include a recommendation feed item include, for example, when a user has scrolled to a particular location in the event feed (e.g., scrolled past a certain number of feed items), or when the user has scrolled to an end of the event feed (e.g., all feed items that were selected for display to the user have been viewed or scrolled through by the user). When the conditions are satisfied, the event feed service 110 may determine information about the user's current state in order to determine what feed item sources to recommend to the user. The information may include, for example, what software application the user is currently engaging with, what graphical user interface the user is currently viewing, what content the user is currently engaging with, etc. The event feed service 110 may use that information to generate or otherwise select feed item sources that are relevant to the user (e.g., having a sufficiently high confidence value) and are relevant to the current application environment of the user (e.g., the particular software application and/or graphical user interface that the user is engaging with, the content the user is engaging with, etc.).

The content and appearance of the event feed and the feed item source recommendations provided by the event feed service 110 to the client device 104-1 may also be tailored for the particular application environment in which the user is operating. For example, the particular application environment in which the user is operating may define which particular feed items are included in the event feed, the order of feed items in the event feed, the appearance (e.g., graphical presentation) of the event feed, the particular feed item sources that are recommended, or the like. Accordingly, the event feed service 110 generates and provides event feeds and feed item source recommendations that are customized to individual users and to the application environment in which the event feed is presented. Once the event feed is generated it may be sent to the client device 104-1 (e.g., event feed 122 in FIG. 1B) for display to the user. The event feed may be provided to the client device 104-1 according to a push protocol in which the event feed service 110 sends the event feed (or feed items) according to a schedule (e.g., in response to a feed item being generated), or according to a fetch protocol in which the client device requests the event feed or feed items from the event feed service 110 (e.g., according to an update cycle or schedule, when the user instantiates a different software application, or the like).

Figure 2A:
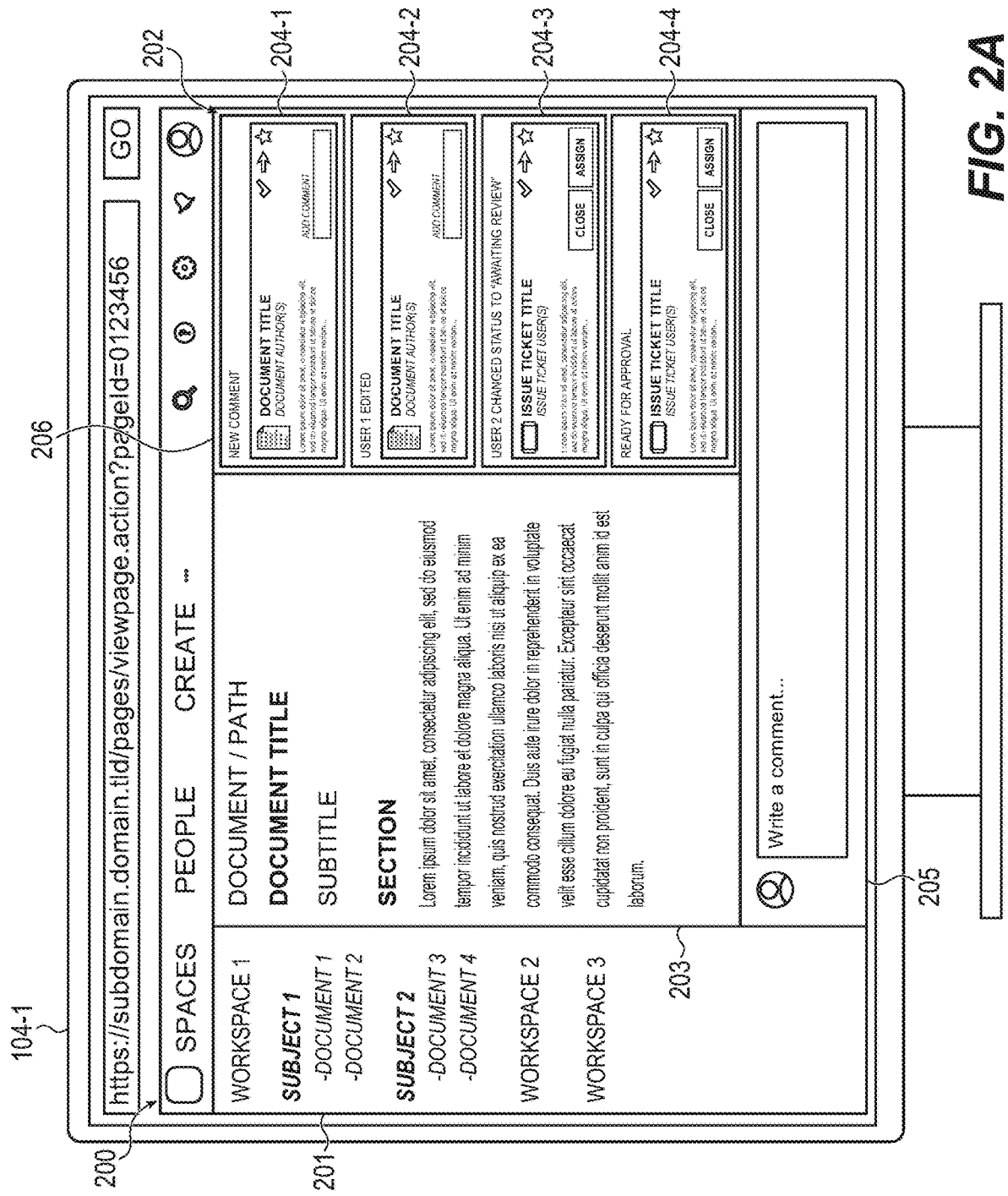
Figure 2B:
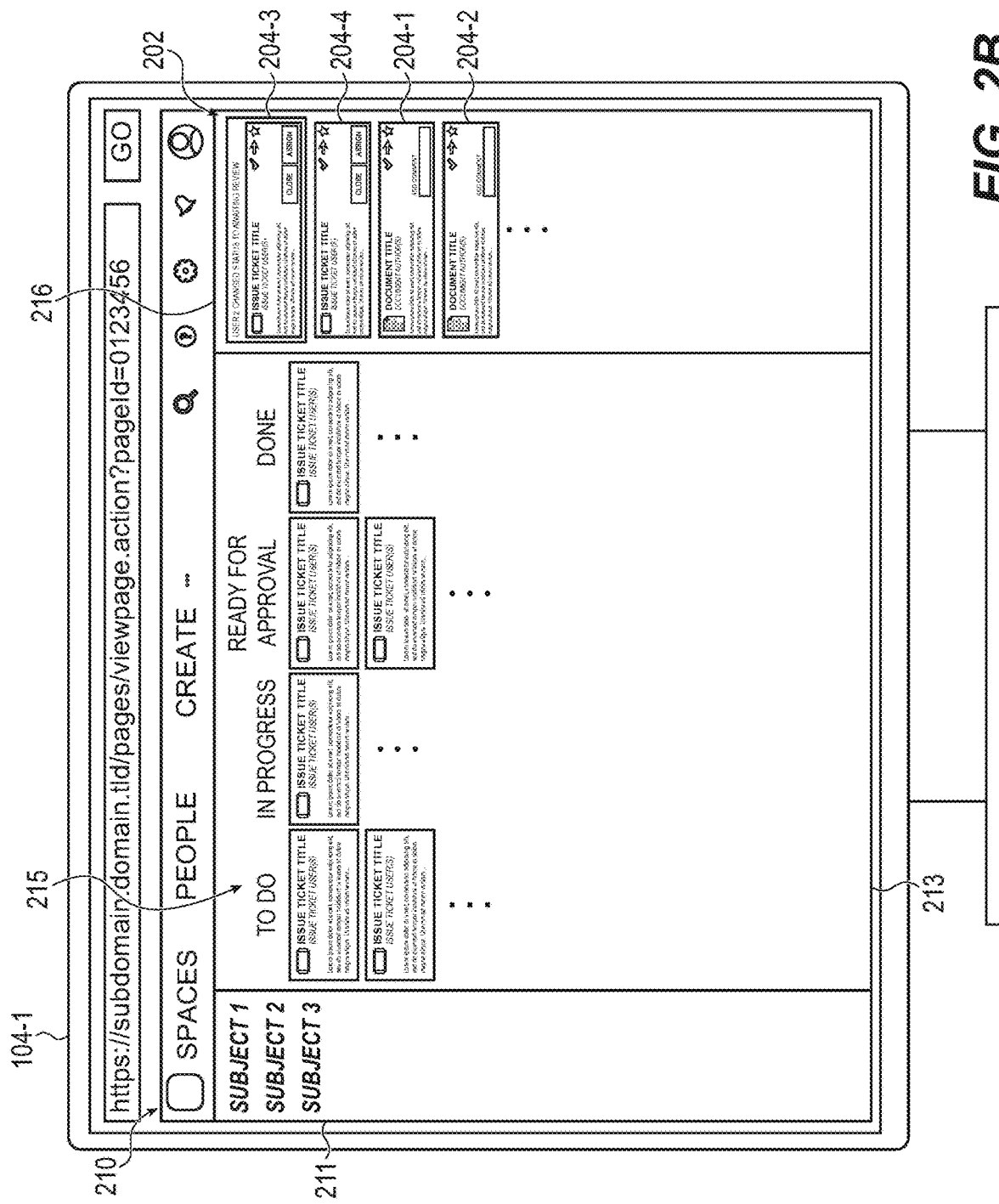
Figure 2C:
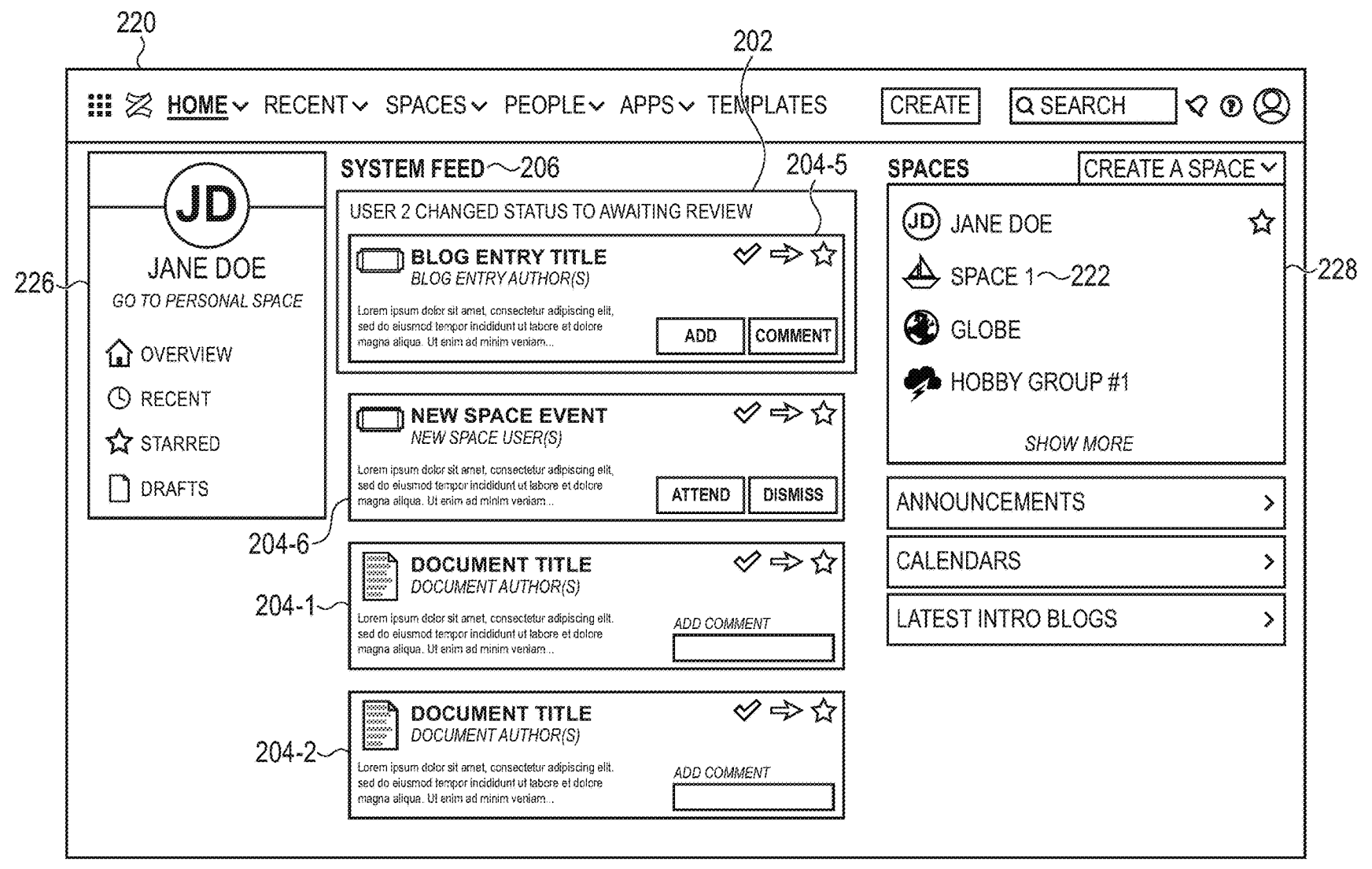

As described above, event feeds may be displayed to users in various different software applications. More particularly, event feeds may be user-specific, rather than application-specific, and as such, a user's event feed may be displayed to the user in the graphical user interfaces of multiple different software applications. In some cases, a user's event feed may have a different appearance or different feed settings based on the particular software application in which the event feed is being displayed. FIGS. 2A-2C illustrate an example event feed 202 for a user being displayed in the graphical user interfaces of different example software applications and contexts, illustrating how the same event feed (e.g., the event feed associated with the user) may have different feed settings in the graphical user interfaces of different software applications and application contexts, leading to the event feed having a different appearance, presentation, and/or function in different software applications.

Figure 5A:
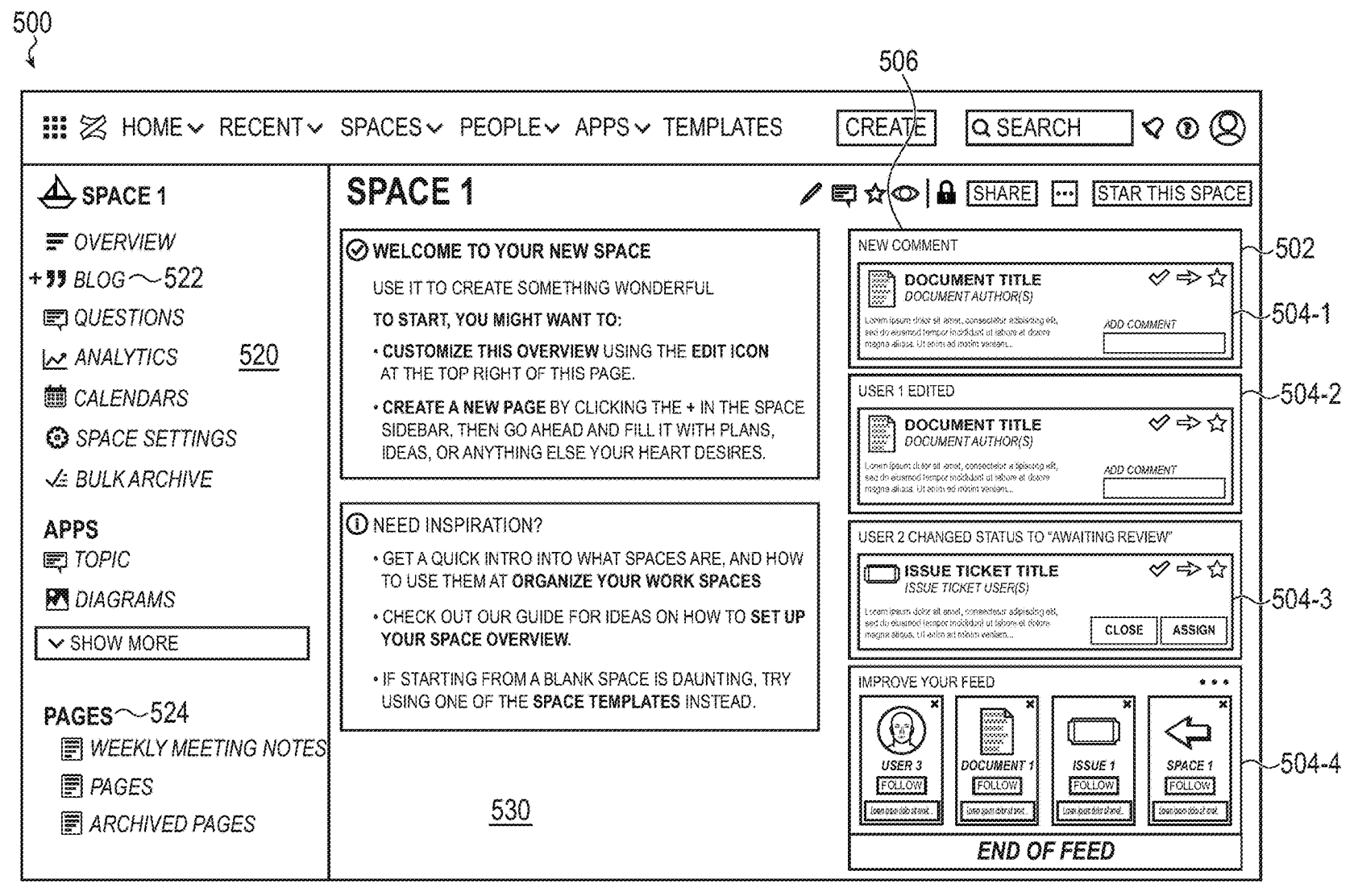
Figure 5B:
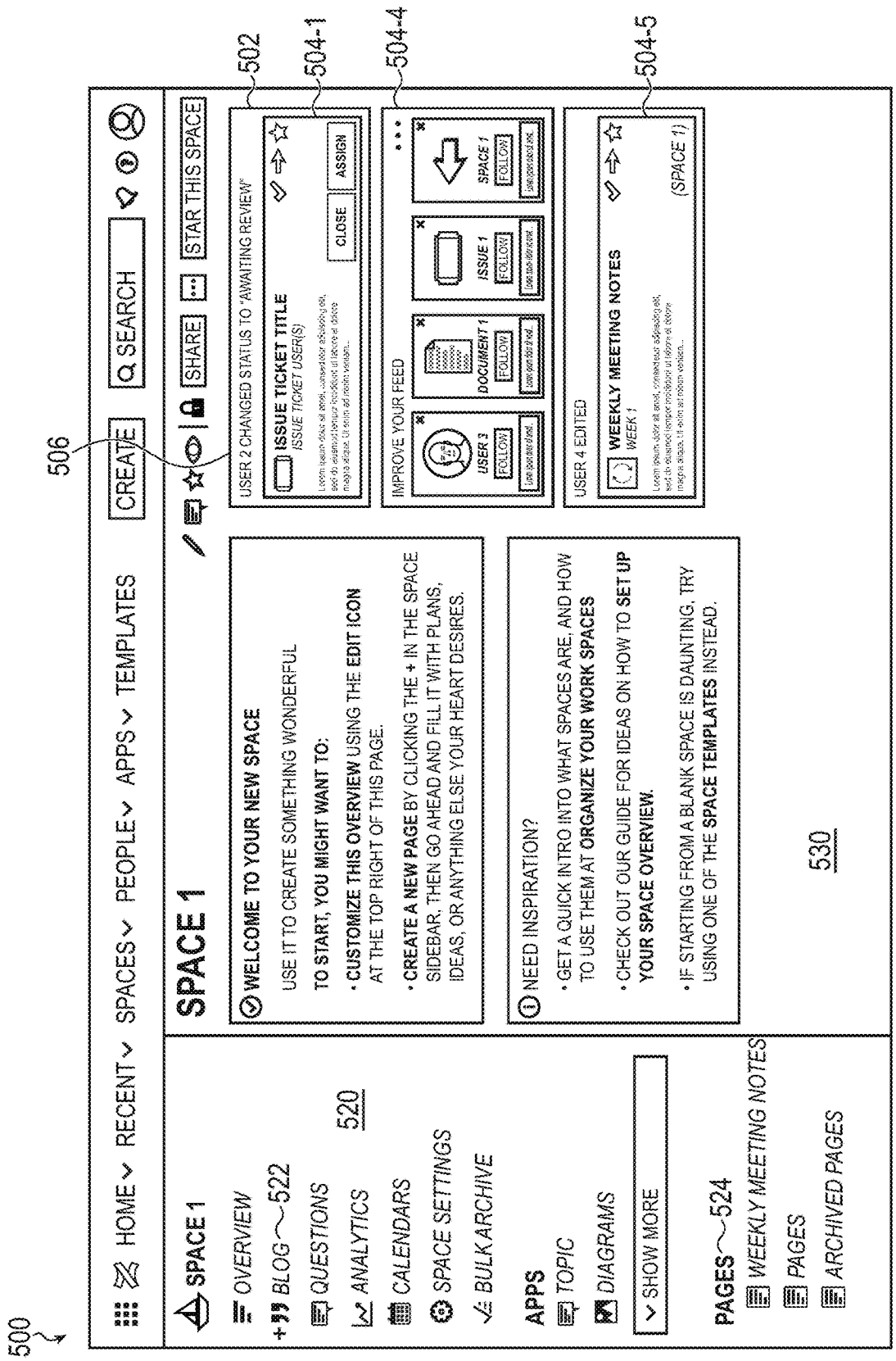
Figure 5C:
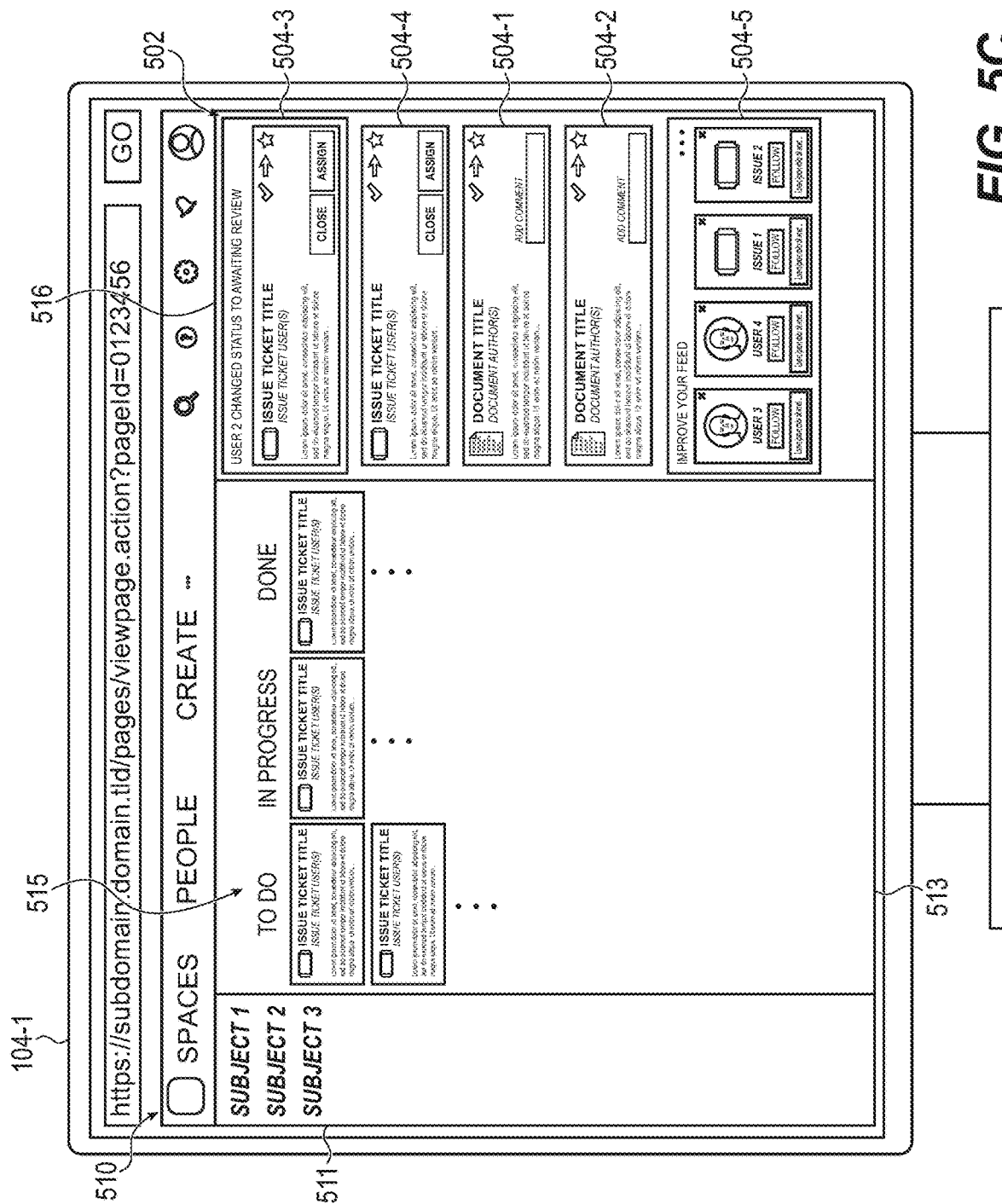

FIG. 2A illustrates a client device 104-1 displaying an example graphical user interface 200 associated with a collaborative document system or content collaboration system or platform (e.g., an example of a software application). The graphical user interface (GUI) 200 may correspond to a document space having a document region 203 and a navigation region 201. As used herein, the document region 203 may also be referred to as a content panel 203 and the navigation region 201 may also be referred to as a navigation panel 201. The navigation region 201 may include a hierarchical element tree also referred to herein as a document tree or page tree. The hierarchical element tree includes a set of documents or pages that have a hierarchical relationship (e.g., parent, child, sibling) to each other and each element of the tree may be selectable to cause display of content associated with the page or document corresponding to the selected element. While a document or page tree is depicted in this example, the GUI 200 may also include a similar hierarchical element tree for blog entries or other user-generated content. Other views of alternative space view or GUIs are depicted in FIGS. 5A-5C.

In the example of FIG. 2A, the document region 203 may display the contents of a selected document, page, or blog post, including text, images, videos, interactive content, or the like, and may allow a user to edit the selected document, page, blog post, or other digital item (e.g., to add, change, or remove content). In general, when an authenticated user has edit permissions with respect to the displayed content and the graphical user interface is in an edit mode (rather than a view mode), the document region 203 may operate as a content editor and allow the user to directly add, edit, modify, or otherwise interact with the content of the document, page, blog, or other item. The document region 203 may also include an input field 205 into which a user may input text or other content to add a comment, note, or other content to a document. The navigation region 201 may display a list of document spaces or workspace identifiers associated with the collaborative document system, as well as subjects and documents associated with each document space or workspace.

The GUI 200 is associated with a particular user, and may be customized for that particular user. For example, it may display only those workspaces, subjects, and documents for which the user is authorized. Similarly, in accordance with the user having appropriate permissions with respect to the displayed content, the GUI 200 may be transitioned to an edit mode to enable editing of content of respective digital items in the document region 203. In some cases, when the GUI 200 is transitioned to an edit mode, the document region 203 is displayed in a full-screen mode and the display of the navigation region 201 may be suppressed or hidden.

The GUI 200 may also include an event feed region 206 in which an event feed 202 associated with the user may be displayed. As described herein, the event feed 202 may be unique to the user of the client device 104-1, and may include feed items that relate to content items across multiple different software applications. For example, while the event feed 202 is being displayed in the GUI 200 of a collaborative document system, it includes feed items relating both to documents in the collaborative document system (feed items 204-1, 204-2) and to issue tickets of an issue tracking system (feed items 204-3, 204-4). While only feed items from a collaborative document system and an issue tracking system are shown in FIG. 2A, it will be understood that the example event feed 202 may include feed items related to other content items and/or from other content sources (e.g., other software applications).

Further, the manner in which the event feed 202 is displayed may be based on the particular software application in which it is being displayed and/or the context of particular view or state of the software application. Stated another way, feed settings for the event feed may differ for different software applications and/or contexts. For example, in some cases the order of the feed items 204 in the event feed 202 is based on the software application in which it is displayed. In FIG. 2A, the event feed 202 is displayed in the GUI of a collaborative document system (e.g., the software application and/or software environment is that of a collaborative document system). Accordingly, feed items 204-1 and 204-2, which relate to user-generated documents in the collaborative document system, are prioritized and displayed higher in the list order. Additionally or alternatively, the feed items 204-1 and 204-2 may relate to a current document space or workspace and, thus, may be prioritized with respect to other feed items. This is merely one example, however, and in some cases feed items relating to different software applications or content sources are displayed higher in the list order.

The event feed 202 may be scrollable, such that displayed feed items 204 may be scrolled out of view (e.g., towards the top of the GUI 200), while new feed items 204 may populate at the bottom of the event feed 202. When the end of the event feed 202 is reached (e.g., when there no more feed items 204 that have been selected for display), a recommendation feed item may be included as a last feed item in the event feed 202. In some cases, the status of a feed item that is scrolled out of view may define how and whether the feed item is reincorporated into the event feed. For example, if the feed item has been marked as read or otherwise acknowledged when it is scrolled out of view (e.g., the user selected the check mark in the feed item), the feed item may be removed from the event feed. If the feed item has been marked for follow-up or favorited when it is scrolled out of view (e.g., the user selected the star in the feed item), the feed item may remain in the event feed and may be displayed in the event feed at a later time. For example, it may appear at the top of the event feed 202 after a predetermined time, or it may be positioned in a lower order in the event feed such that it appears in due course when the user scrolls through the event feed. In some cases, a favorited or otherwise marked feed item may be included in a list of feed items that a user can navigate to and view at any time.

As noted above, event feed preferences may be customized for individual users. Such customizations may be automatically generated based on user interaction histories. For example, event feeds may be ordered based on the way in which a user has historically interacted with the event feeds (e.g., promoting feed items that are similar to others that the user historically interacts with most frequently). Such customizations may also be specified by a user. For example, the user may configure their event feeds to be ordered according to different ordering schemes when the feed is displayed in different application user interfaces. User may also establish automations for feed items. Such automations may control aspects of the feed items themselves (e.g., muting, dismissing, sharing, redirecting, or favoriting feed items related to a particular project or being associated with a particular type of content, or the like), or they may modify or otherwise affect the underlying content item. For example, a user may configure an automation that causes all incoming feed items that request a user assignment to be assigned to a particular user.

FIG. 2B illustrates the client device 104-1 displaying a GUI of a different software application than in FIG. 2A, illustrating how the event feed 202 may be displayed differently in this GUI. For example, FIG. 2B illustrates an example GUI 210 associated with an issue tracking system (e.g., an example of a software application). The GUI 210 may include an issue ticket region 213 and a navigation region 211. The issue ticket region 213 may display representations of issue tickets 215, which may optionally be grouped by their status and arranged in columns. In some cases, a user selection of a representation of an issue ticket 215 causes the GUI 210 to display an issue ticket interface in which a user can review, edit, or otherwise interact with the content of the selected issue ticket. The representations of issue tickets 215 may be grouped based on their status. For example the GUI 210 shows the representations 215 grouped in columns associated with issue ticket statuses.

The navigation region 211 may display a list of subjects with which individual issue tickets may be associated. For example, the subjects may be associated with software applications and/or software code to which the issue tickets relate. As another example, the subjects may be associated with departments in an organization to which issue tickets relate. A user selection of a different subject in the navigation region 211 may cause a different set of issue ticket representations 215 to be displayed in the issue ticket region 213.

The GUI 210 may also include an event feed region 216 in which the event feed 202 associated with the user may be displayed. As described above, because FIG. 2B relates to the same user as FIG. 2A, the event feed 202 may be the same event feed as that shown in the GUI 200 of the collaborative document system. However, because it is being displayed in conjunction with a different software application (e.g., an issue tracking system), the event feed 202 is displayed differently. For example, because the event feed 202 is displayed in the GUI 210 of the issue tracking system, feed items 204-3 and 204-4, which relate to issue tickets in the issue tracking system, are prioritized and displayed higher in the list order. This is merely one example, however, and in some cases feed items relating to different software applications or content sources are displayed higher in the list order. Scrolling and other operations of the event feed 202 in the GUI 210 may be the same or similar as those described with respect to FIG. 2A.

When the end of the event feed 202 is reached in the GUI 210, a recommendation feed item may be displayed. As described herein, the feed source recommendations in the recommendation feed item may be selected based on the particular software application in which the event feed is being displayed. Thus, as described in greater detail with respect to FIGS. 5A-5C, for the same user, the recommendation feed items may be different if the user is interacting with the GUI 210 of the issue tracking system, or the GUI 200 of the collaborative document system, or the GUI of another software system (e.g., a codebase system, a messaging application, a project management application, etc.).

FIG. 2C depicts an other graphical user interface (GUI) 220 associated with a collaborative document system or content collaboration system or platform (e.g., an example of a software application. The GUI 220 may be the same collaborative document system as depicted in FIG. 2A but in a different context. Specifically, the GUI 220 may correspond to a home screen for the collaborative document system, which may not be associated with a particular document space or workspace. As shown in FIG. 2C, the GUI 220 includes a feed region 206 having a feed 202. The items of the feed 202 may correspond to the items and order of the feed 202 depicted in FIG. 2A. Alternatively, the feed 202 may be displayed in accordance with a selected or designated document space or workspace (e.g., "Space 1" 222). As shown in FIG. 2C, entries that are associated with events generated in the corresponding document space ("Space 1" 222) may be added and/or prioritized in the feed 202. Specifically, a feed item 204-5 corresponding to a new or edited blog entry for Space 1 and a feed item 204-6 corresponding to a new space event of a calendar for Space 1 may be added and/or prioritized in the feed 202. As such, within a given software application, the feed may change depending on the context (e.g., selected or displayed document space).

As shown in FIG. 2C, the GUI 220 includes a main navigational region 226, which includes controls or items that are associated with the authenticated user (e.g., Jane Doe). The GUI 220 also includes a list of spaces 228 in which the user account for the authenticated user has administrator authority or permissions. Generally, administrator permissions are granted to a user account that has created the document space or has been specifically granted to the user account by a space administrator. As discussed previously, administrator permissions with regard to a space includes the ability to designate or set permissions with respect to space content for designated system users.

While FIGS. 2A-2C illustrate one example feed setting that may differ between different software applications or application contexts (e.g., the order of feed items), this is merely one example of a feed setting that may differ. In some cases, other feed settings that may differ include a size of the feed items, a maximum or minimum number of feed items displayed at a given time, an amount of content in each feed item, a location of the event feed, a type of graphical presentation of the event feed, scrolling behavior of the event feed, and the types of feed items that are included in the event feed. Other feed settings are also contemplated.

FIGS. 3A-3D illustrate nonlimiting examples of feed items that may be included in an event feed. Feed items may also be referred to as tiles, and they may be displayed as a list of tiles in a graphical user interface of a software application, as described herein.

Figure 3A:
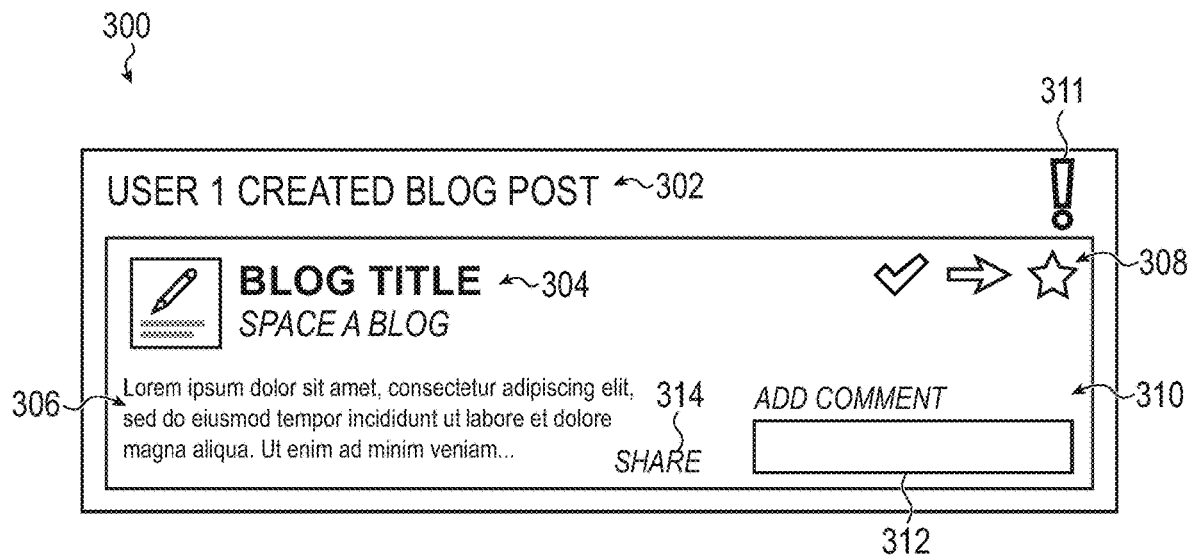
FIGS. 3A-3D depict example feed items for an event feed as described herein.

FIG. 3A illustrates an example feed item 300 that pertains to user-generated content, specifically a blog entry, that may be stored in association with a collaborative document system. The blog entry may be stored in or associated with a particular document space of a collaborative document system also referred to herein as a content collaboration system. The collaborative document system may be an example of a software application 112, as described above (e.g., the software application 112-1).

The feed item 300 may include a feed item title 302. The feed item title 302 may include information about the feed item, such as a description or other indication of the event that caused the feed item to be generated (e.g., that caused a notification of the event to be provided to the event feed service 110). In the example of FIG. 3A, the feed item title 302 states that a blog post or entry was created, and the identity of the user who created the blog post (or a username of the user who last edited or published the blog post). Thus, the viewer of the feed item 300 can quickly and easily determine the event that initiated the feed item. In some cases, the feed item title 302 includes more, less, or different information, such as a title or other identifier of the content, a timestamp of the event, or the like.

The feed item 300 may also include a reference 304 to the content item to which the feed item 300 relates. For example, the reference 304 may include a title of the content item, an author of the content item, a size of the content item, a subject of the content item, or any other suitable information. The information included in the reference 304 may be taken from metadata associated with the content item, or from the content item itself. The reference may also include an icon or graphical element that indicates the type of event or source of the feed item, Here, the graphical element indicates that the source is a blog (as indicated by the pencil and text graphic). Other events may have a different icon or graphical element that corresponds to the source of the feed item or context of the event that triggered the feed item.

The feed item 300 may also include a content preview 306. The content preview 306 may include a portion of content extracted from the content item. In some cases, the content of the content preview 306 is selected based on the event that caused the feed item to be generated. For example, the content in the content preview 306 may include part of the content item that was created and/or a content summary. In some cases, a user selection (e.g., a click, touch, tap, etc.) on the content preview 306, the reference 304, and/or the feed item title 302 may cause the content item to be displayed to the user. In some cases, this may include initiating a different software application (or graphical interface thereof) to display the content item to the user. For example, if a first graphical user interface of a first software application is being displayed to a user, and the feed item is displayed in an event feed in the first graphical user interface, selection of the feed item (e.g., the content preview, reference, title, etc.) may cause a second graphical interface of a second software application to be displayed to the user. As one specific example, if a user is viewing an event feed in a graphical user interface of an issue tracking system, selecting a feed item associated with a user-generated content item may cause a graphical user interface of a collaborative document system to be displayed to the user (optionally entirely in place of the graphical user interface of the issue tracking system). Similarly, if the feed item 300 is displayed in the context of a first document space, selecting the feed item 300 may cause a second document space associated with the newly created blog post to be displayed.

The feed item 300 may also include feed item controls 308. Feed item controls may be selectable input objects that allow a user to interact with the feed item 300. For example, the feed item controls 308 shown in FIG. 3A include a star, an arrow, and a check mark. A user selection of the star may indicate that the user has "flagged" the feed item. Flagging the feed item may associate the feed item with a list of feed items for follow-up, and may result in the feed item being displayed in a different position in an event feed, or in a different event feed, or re-displayed in the event feed at another time. Flagged feed items may also or alternatively appear in a separate list of feed items or tasks. For example, flagged feed items may appear in a to-do list or "action" list for that user, which may be displayed separately from the event feed (or otherwise accessible in a manner different from the event feed).

A user selection of the arrow may allow a user to forward the feed item 300 to another user's attention (e.g., to "share" the feed item 300). Such action may cause the feed item 300 to be displayed in the other user's event feed (or otherwise sent to the other user's attention), optionally with an indication of who sent the feed item 300. A user selection of the check mark may mark the feed item 300 as having been read or acknowledged. Such action may cause the feed item 300 to be removed from the user's event feed, muted, or prevented from being displayed in the event feed again.

The feed item 300 may also include an actionable input object 310. The actionable input object 310 facilitates user interaction with the underlying content item to which the feed item 300 relates. For example, the feed item 300 may relate to a user-generated blog post in a document space of a collaborative document system. Accordingly, the actionable input object 310 may allow the user to interact with (e.g., modify) the underlying user-generated blog post. For example, the actionable input object 310 may include a text input field 312. A user can input text into the text input field 312 in the feed item 300, thereby causing that text to be added to the user-generated blog post as a comment or other feedback content. In FIG. 3A, the text is to be added as a comment to a user-generated content, though this is merely one example, and text may be added to other portions of the content and/or for other purposes.

As described herein, feed items may be associated with an urgency, due date, imminence, or the like, which may be used to determine how, when, and how frequently (among other possible factors) to display feed items to a user. In some cases, a feed item may include an indicia of urgency (such as the indicum 311) based on the urgency, imminence of an upcoming due date, or the like.

Figure 3B:
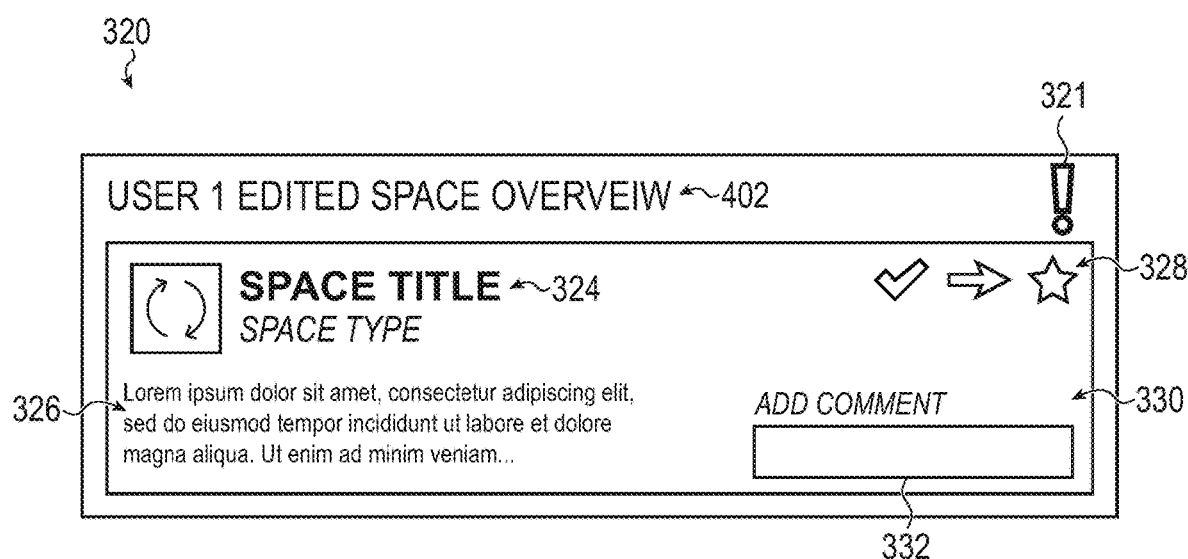

FIG. 3B illustrates an example feed item 320 that pertains to an event occurring with respect to a document space or workspace. The document space may be implemented as part of a software application 112, as described above (e.g., the software application 112-1). In particular, the software application may be a collaborative document system, also referred to herein as a content collaboration system or platform.

The feed item 320 may include a feed item title 322. The feed item title 322 may include information about the feed item, such as a description or other indication of the event that caused the feed item to be generated (e.g., that caused a notification of the event to be provided to the event feed service 110). In the example of FIG. 3B, the feed item title 322 states that content associated with a document space has been added or modified. Specifically, the user 1 has edited the space overview content associated with a particular space identified by the space title. Thus, the viewer of the feed item 320 can quickly and easily determine the event that initiated the feed item. In some cases, the feed item title 322 includes more, less, or different information, such as a title or other identifier of the document space, a timestamp of the event, a name of the space administrator, or other space-related content.

The feed item 320 may also include a reference 324 to the content item to which the feed item 320 relates. For example, the reference 324 may include a title of the document space, the type of space (e.g., a knowledge base space, documentation space, team space), or other information related to the space and/or triggering event. The information included in the reference 324 may be taken from metadata associated with the space or from the space itself.

The feed item 320 may also include a content preview 326. The content preview 326 may include a portion of content extracted from the content item. In one example, the content preview 326 may include a portion of a user-generated content from the space overview. In some cases, the content of the content preview 326 is selected based on the event that caused the feed item to be generated. For example, the content in the content preview 326 may include a snippet of text that was edited or information about the user account associated with the editing event.

In some cases, a user selection (e.g., a click, touch, tap, etc.) on the content preview 326, the reference 324, and/or the feed item title 322 may cause the content item to be displayed to the user. In some cases, this may include initiating a different software application (or graphical interface thereof) to display the content item to the user. For example, if a first graphical user interface of a first software application is being displayed to a user, and the feed item is displayed in an event feed in the first graphical user interface, selection of the feed item (e.g., the content preview, reference, title, etc.) may cause a second graphical interface of a second software application to be displayed to the user. Similarly, the graphical user interface may be transitioned or changed from a first space in which the feed is being displayed to a second space, which corresponds to the event triggering the feed item.

Similar to the other example described above, the feed item 320 may also include feed item controls 328. Feed item controls may be selectable input objects that allow a user to interact with the feed item 320. Feed item controls 328 may be the same as the feed item controls 308 described with respect to FIG. 3A, and may operate the same in the context of the feed item 320. Also similar to previous examples, the feed item 320 also includes actionable input objects 330, which may include controls and an input field 332 that may enable the user to enter content into the feed item 320, which may be added to the space content as a comment or other content.

Figure 3C:
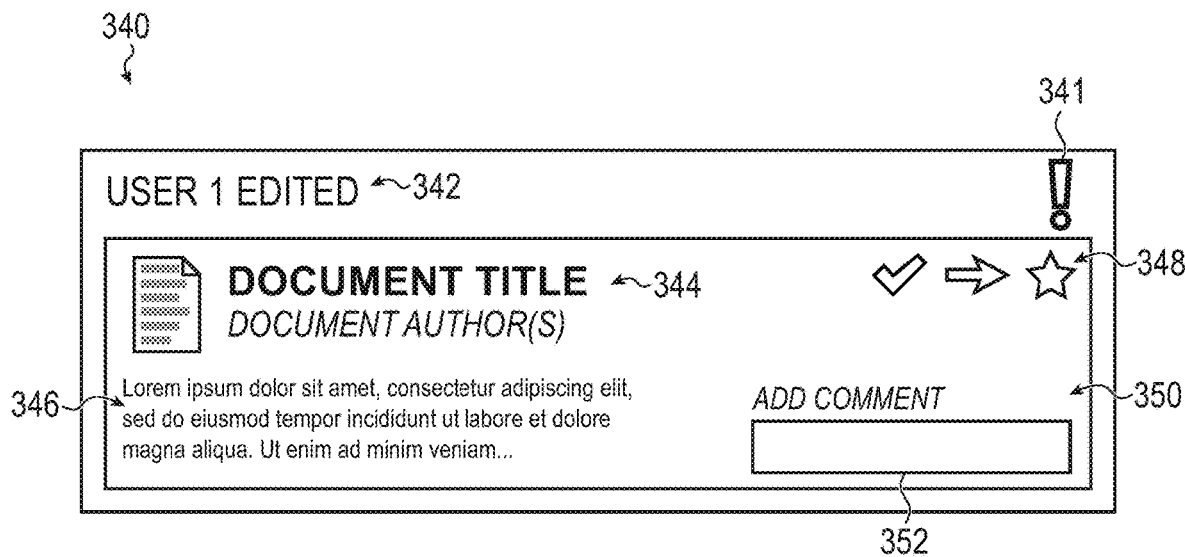

FIG. 3C illustrates an example feed item 340 that pertains to a document, such as a user-generated document that may be stored in association with a collaborative document system. The collaborative document system may be an example of a software application 112, as described above (e.g., the software application 112-1).

The feed item 340 may include a feed item title 342. The feed item title 342 may include information about the feed item, such as a description or other indication of the event that caused the feed item to be generated (e.g., that caused a notification of the event to be provided to the event feed service 110). In the example of FIG. 3C, the feed item title 342 states that a document was edited, and the identity of the user who edited the document (e.g., a username of the user who edited the document). Thus, the viewer of the feed item 340 can quickly and easily determine the event that initiated the feed item. In some cases, the feed item title 342 includes more, less, or different information, such as a title or other identifier of the document, a timestamp of the event, or the like.

The feed item 340 may also include a reference 344 to the content item to which the feed item 340 relates. For example, the reference 344 may include a title of the content item, an author of the content item, a size of the content item, a subject of the content item, or any other suitable information. The information included in the reference 344 may be taken from metadata associated with the content item, or from the content item itself.

The feed item 340 may also include a content preview 346. The content preview 346 may include a portion of content extracted from the content item. In some cases, the content of the content preview 346 is selected based on the event that caused the feed item to be generated. For example, the content in the content preview 346 may include part of the content item that was edited (e.g., the edit(s) that initiated the creation of the feed item 340). In some cases, a user selection (e.g., a click, touch, tap, etc.) on the content preview 346, the reference 344, and/or the feed item title 342 may cause the content item to be displayed to the user. In some cases, this may include initiating a different software application (or graphical interface thereof) to display the content item to the user. For example, if a first graphical user interface of a first software application is being displayed to a user, and the feed item is displayed in an event feed in the first graphical user interface, selection of the feed item (e.g., the content preview, reference, title, etc.) may cause a second graphical interface of a second software application to be displayed to the user. As one specific example, if a user is viewing an event feed in a graphical user interface of an issue tracking system, selecting a feed item associated with a user-generated document may cause a graphical user interface of a collaborative document system to be displayed to the user (optionally entirely in place of the graphical user interface of the issue tracking system).

The feed item 340 may also include feed item controls 348. Feed item controls may be selectable input objects that allow a user to interact with the feed item 340. For example, the feed item controls 348 shown in FIG. 3C include a star, an arrow, and a check mark. A user selection of the star may indicate that the user has "flagged" the feed item. Flagging the feed item may associate the feed item with a list of feed items for follow-up, and may result in the feed item being displayed in a different position in an event feed, or in a different event feed, or re-displayed in the event feed at another time. Flagged feed items may also or alternatively appear in a separate list of feed items or tasks. For example, flagged feed items may appear in a to-do list or "action" list for that user, which may be displayed separately from the event feed (or otherwise accessible in a manner different from the event feed).

A user selection of the arrow may allow a user to forward the feed item 340 to another user's attention (e.g., to "share" the feed item 340). Such action may cause the feed item 340 to be displayed in the other user's event feed (or otherwise sent to the other user's attention), optionally with an indication of who sent the feed item 340. A user selection of the check mark may mark the feed item 340 as having been read or acknowledged. Such action may cause the feed item 340 to be removed from the user's event feed, muted, or prevented from being displayed in the event feed again.

The feed item 340 may also include an actionable input object 350. The actionable input object 350 facilitates user interaction with the underlying content item to which the feed item 340 relates. For example, the feed item 340 may relate to a user-generated document in a collaborative document system. Accordingly, the actionable input object 350 may allow the user to interact with (e.g., modify) the underlying user-generated document. For example, the actionable input object 350 may include a text input field 352. A user can input text into the text input field 352 in the feed item 340, thereby causing that text to be added to the user-generated document. In FIG. 3C, the text is to be added as a comment to a user-generated document, though this is merely one example, and text may be added to other portions of the document and/or for other purposes.

As described herein, feed items may be associated with an urgency, due date, imminence, or the like, which may be used to determine how, when, and how frequently (among other possible factors) to display feed items to a user. In some cases, a feed item may include an indicia of urgency (such as the indicum 351) based on the urgency, imminence of an upcoming due date, or the like.

Figure 3D:
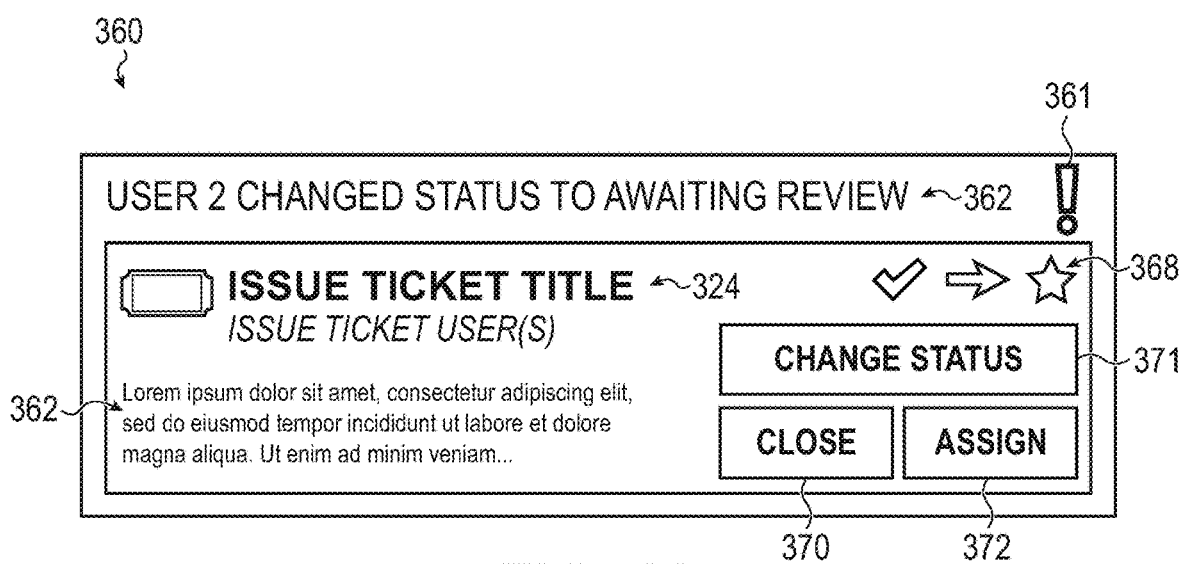

FIG. 3D illustrates an example feed item 360 that pertains to an issue ticket that may be stored in association with an issue tracking system. The issue tracking system may be an example of a software application 112, as described above (e.g., the software application 112-2).

The feed item 360 may include a feed item title 362. The feed item title 362 may include information about the feed item, such as a description or other indication of the event that caused the feed item to be generated (e.g., that caused a notification of the event to be provided to the event feed service 110). In the example of FIG. 3D, the feed item title 362 states that a status of the issue ticket was changed, and the status to which it was changed (e.g., awaiting review). Thus, the viewer of the feed item 360 can quickly and easily determine the event that initiated the feed item. In some cases, the feed item title 362 includes more, less, or different information, such as a title or other identifier of the issue ticket, a timestamp of the event, a previous status of the issue ticket, or the like.

The feed item 360 may also include a reference 364 to the content item to which the feed item 360 relates. For example, the reference 364 may include a title of the issue ticket, users associated with and/or assigned to the issue ticket, an author of the issue ticket, a software (or other) product to which the issue ticket relates, or any other suitable information. The information included in the reference 364 may be taken from metadata associated with the content item, or from the content item itself.

The feed item 360 may also include a content preview 366. The content preview 366 may include a portion of content extracted from the content item. In one example, the content preview 366 may include a portion of a user-generated specification of an issue in computer code of a software product to which the issue ticket relates. In some cases, the content of the content preview 366 is selected based on the event that caused the feed item to be generated. For example, the content in the content preview 366 may include an update to the issue ticket that accompanied the change in status of the issue ticket.

In some cases, a user selection (e.g., a click, touch, tap, etc.) on the content preview 366, the reference 364, and/or the feed item title 362 may cause the content item to be displayed to the user. In some cases, this may include initiating a different software application (or graphical interface thereof) to display the content item to the user. For example, if a first graphical user interface of a first software application is being displayed to a user, and the feed item is displayed in an event feed in the first graphical user interface, selection of the feed item (e.g., the content preview, reference, title, etc.) may cause a second graphical interface of a second software application to be displayed to the user. As one specific example if a user is viewing an event feed in a graphical user interface of a collaborative document system, selecting a feed item associated with an issue ticket may cause a graphical user interface of an issue tracking system to be displayed to the user (optionally entirely in place of the graphical user interface of the collaborative document system).

The feed item 350 may also include feed item controls 368. Feed item controls may be selectable input objects that allow a user to interact with the feed item 360. Feed item controls 368 may be the same as the feed item controls 308 described with respect to FIG. 3A, and may operate the same in the context of the feed item 360.

The feed item 360 also includes actionable input objects 370, 371, 372 (e.g., button objects). As noted above, the actionable input objects facilitate user interaction with the underlying content item to which the feed item 370 relates. For example, as noted above, the feed item 370 may relate to an issue ticket of an issue tracking system. Accordingly, the actionable input objects 370, 372 may allow the user to interact with (e.g., modify) the underlying issue ticket. The feed item 370 also includes an optional indicia of urgency (such as the indicum 371) based on the urgency, imminence of an upcoming due date, or the like.

Figure 4A:
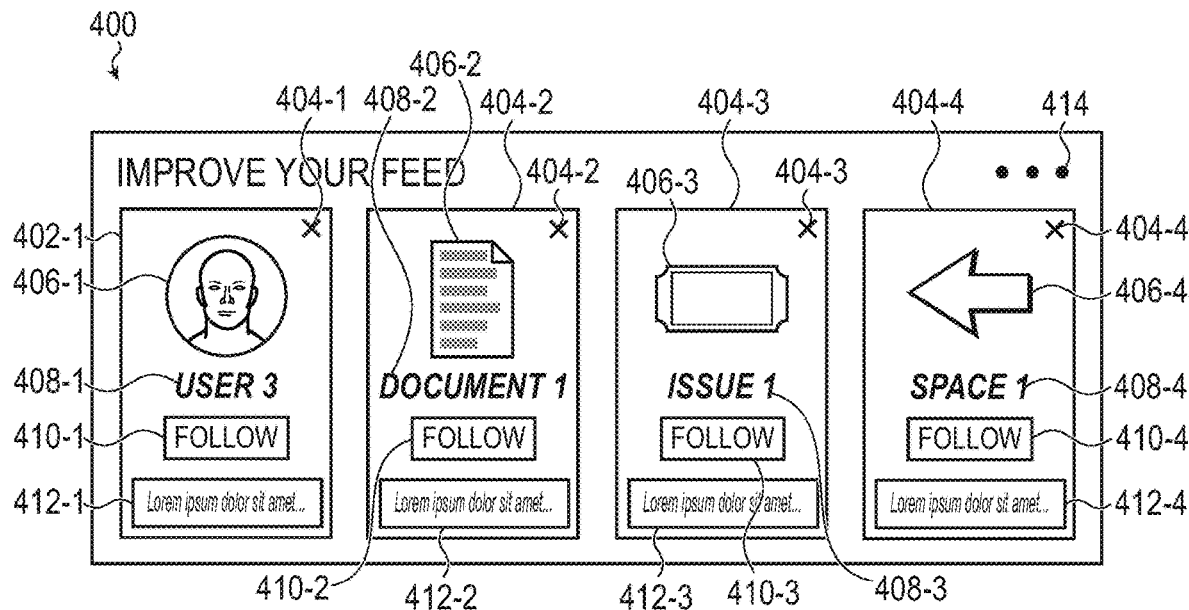
FIGS. 4A-4D depict an example recommendation feed item for an event feed as described herein.

FIG. 4A illustrates a nonlimiting example of a recommendation feed item 400 that may be displayed in an event feed, as described herein. The recommendation feed item 400 may be a tile for display to a user in a list of tiles. More particularly, an event feed may be a list of tiles, where the tiles include feed items (e.g., the feed items 300, 320), and in response to certain conditions being met, one or more recommendation feed items (e.g., the recommendation feed item 400).

The recommendation feed item 400 may include one or more cards 402 (e.g., 402-1, . . . , 402-n) representing feed item source recommendations. The cards 402 may be associated with feed item sources of different types. For example, the cards 402 may represent feed item sources such as users (e.g., the user's activities in a networked computer system 100 and/or an application platform 102 cause feed items to be generated with respect to those activities), documents (e.g., events occurring with respect to documents cause feed items to be generated with respect to those events), issues (e.g., events occurring with respect to issues and/or issue tickets of an issue tracking system cause feed items to be generated with respect to those issues), spaces (e.g., events occurring with respect to content or items associated with a document space defined in an application platform thereby causing feed items to be generated with respect to that document space), and so forth.

The particular cards 402 included in a recommendation feed item 400 may be selected based on the relevancy of the feed item source to a user (e.g., a relevancy score, classifier, or confidence value which satisfies a criteria, as described herein). Further, in some cases, the particular cards 402 (or more particularly, the feed item sources represented by the cards 402) are also selected based on the software application that the user is engaging with when the recommendation feed item 400 is to be displayed. Thus, for example, different cards 402 will be displayed in a user's event feed when it is displayed in a GUI of a collaborative document system than when it is displayed in a GUI of an issue tracking system. Further, in some cases the particular cards 402 are also selected based on the particular content that a user is engaging with (or has recently engaged with) when the recommendation feed item 400 is to be displayed. Thus, for example, different cards 402 will be displayed in a user's event feed when the user is or was recently (e.g., within a time window such as 1 minute, 5 minutes, or the like) viewing a first user-generated document than when the user is or was recently viewing a second user-generated document. Notably, the conditions that trigger the display of the recommendation feed item 400 may be different than the factors that determine what cards to populate in the recommendation feed item 400.

The cards 402 may include information about the feed item source that the represent, as well as selectable elements that, when selected by a user, cause that feed item source to be followed by the user. For example, the card 402-1 includes a graphic 406-1 that is representative of the feed item source and a title 408-1 indicating a name, title, or description of the feed item source. Where the feed item source is a user, the graphic 406-1 may be a photograph or other representation of the user. If no photograph or other representation of the user is available, or if the user has selected not to share a photograph, a default graphic may be used. The default graphic for a feed item source may generally represent the type of source. For example, if the feed item source is a user, the default graphic may be a generic representation of a person, and if the feed item source is a document, the default graphic may be a generic representation of a document.

The card 402-1 may also include a relevance field 412-1. The relevance field 412-1 (also referred to herein as a relevance narrative, recommendation narrative, or reason narrative) may indicate a reason that the feed item source was recommended to the user (e.g., a factor that contributed to a finding that a recommendation metric or value of the feed item source is satisfies a criteria and is predicted to be relevant to the user). The information included in the relevance field 412-1 may be provided by the event feed service 110 (e.g., from a feed source recommendation service 111 of the event feed service 110). For example, the relevance field 412-1 may indicate that the user (e.g., user 3) being recommended by the card 402-1 is being recommend because user 3 edited the same document that the receiving user (e.g., the user to whom the card 402-1 is displayed) was recently viewing. As another example, the relevance field 412-1 may indicate that user 3 is being recommend because user 3 is on a same team within an organization as the receiving user. A number of different factors that contributed to the determination of relevancy of the recommended feed item source may be presented in the relevance field 412-1.

The card 402-1 may also include a selectable element 410-1. When the receiving user selects the selectable element 410-1 (e.g., by clicking on, tapping, pressing, or otherwise selecting the element 410-1), the receiving user may subscribe to or follow the feed item source. Thus, for example, the event feed service 110 may be notified that the receiving user has selected to follow or subscribe to the feed item source, thereby causing the feed service 110 to include feed items from that feed item source in the receiving user's event feed. In some cases, selection of the selectable element 410-1 also causes a feed item from the recommended feed item source to be displayed in the user's event feed (while the recommendation feed item 400 is displayed, and optionally immediately below or above the recommendation feed item 400).

The card 402-1 may also include a dismissal control 404-1. The dismissal control 404-1 may cause the corresponding card to be dismissed and/or removed from the recommendation feed item 400. In some cases, the selection of the dismissal control 404-1 is reported to or detected by the event feed service 110 (and/or the feed source recommendation service 111). The event feed service 110 and/or the feed source recommendation service 111 may use the selection of the dismissal control 404-1 to adjust the way that relevancy for the receiving user is determined. For example, if the feed item source in the card 402-1 was recommended due to the receiving user's participation in a common team as user 3, and the receiving user dismissed the recommendation, the event feed service 110 and/or the feed source recommendation service 111 may assign less relevance or less confidence to other feed item sources that are associated with the common team. Similarly, a selection to follow or subscribe to the feed item source may be used to increase the confidence in the relevance of feed item sources that are associated with the common team. In this way, the receiving user's interactions with the cards in the recommendation feed can help tailor and further improve the relevancy of future feed item source recommendations.

While the foregoing discussion relates to the card 402-1, cards 402 for other feed item sources may include the same or similar elements and my function in the same or similar way as the card 402-1. For example, the card 402-2 may relate to a document, and a user selection of the selectable element 410-2 causes the receiving user to subscribe to or follow the document as a feed item source. Following a document as a feed item source may result in the event feed service including, in the receiving user's event feed, items that relate to the document (e.g., when the document is edited, commented on, changed, viewed, etc.). The card 402-3 may relate to an issue and/or issue ticket of an issue tracking system, and a user selection of the selectable element 410-3 causes the receiving user to subscribe to or follow the issue and/or issue ticket as a feed item source. Following an issue and/or issue ticket as a feed item source may result in the event feed service including, in the receiving user's event feed, items that relate to the issue and/or issue ticket (e.g., changes in status of an issue ticket, changes in the content of an issue ticket, etc.). The card 402-4 may relate to a document space defined in a software application and/or application platform (e.g., the application platform 102), and a user selection of the selectable element 410-4 causes the receiving user to subscribe to or follow events occurring with respect to that particular document space. Following a document space as a feed item source may result in the event feed service including, in the receiving user's event feed, items that relate to content being generated, edited, or otherwise modified with respect to any of the digital objects of the space including, for example, documents, pages, blog entries, calendar events, and the like. Other resulting feed items may related to activity or events generated by users associated with the document space, changes in permissions with respect to the document space, or other activity occurring on the system with respect to the document space.

Figure 4B:
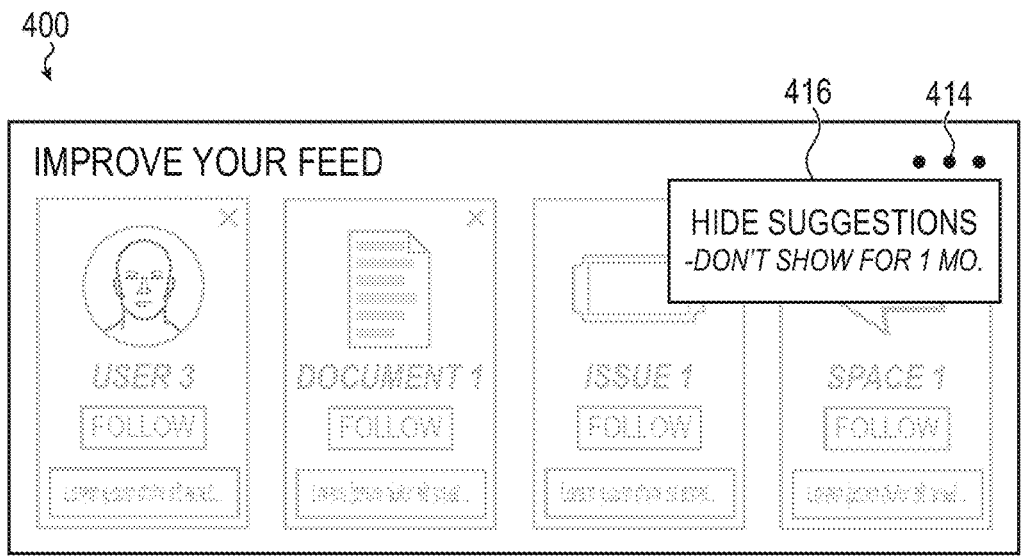

The recommendation feed item 400 also includes a selectable element 414 that, when selected, provides additional options to the user regarding the recommendation feed item 400. For example, as shown in FIG. 4B, when the selectable element 414 is selected, the additional options may be displayed in an interface region 416. The additional options may include, for example, an option to hide the recommendation feed item 400. In some cases, choosing to hide the recommendation feed item 400 causes the recommendation feed item 400 to cease to be displayed. In some cases, it may also cause the event feed service 110 (and/or the feed source recommendation service 111) to not display the recommendation feed item 400 for a period of time (e.g., a fixed time such as 1 month or 1 week, or a user-selectable period of time). Other options may also be included in the interface region 416, such as an option to increase the frequency with which the recommendation feed item 400 is displayed, or an option to navigate to an event feed configuration interface, in which any available setting of a user's event feed may be viewed and/or changed.

Figure 4C:
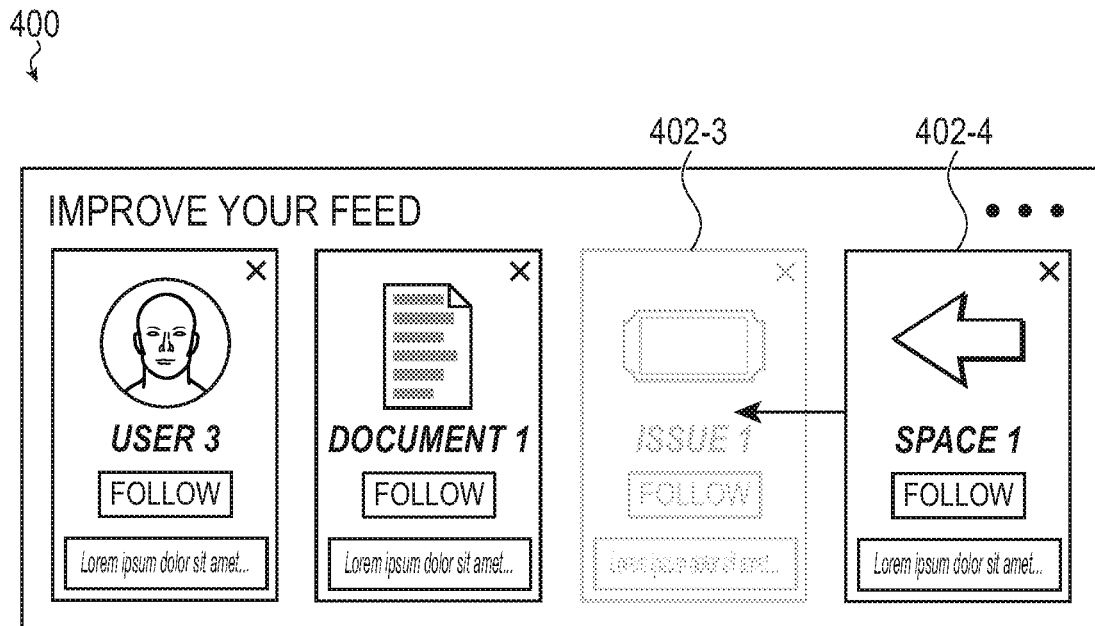

In some cases, the recommendation feed item 400 displays only a subset of potentially relevant feed item sources. In such cases, a dismissal of a card may result in that card being removed from the recommendation feed item 400 (e.g., ceasing to be displayed), and another card being displayed in the recommendation feed item 400. FIG. 4C illustrates the third card 402-3 having been dismissed by the receiving user (e.g., by selecting the dismissal control 404-3, FIG. 4A). In response, the third card 402-3 may cease to be displayed in the recommendation feed item 400. In some cases, another card may take the place of the dismissed card. If the dismissed card is not the last card in the recommendation feed item 400 (e.g., not the rightmost card), a card that is already displayed in the recommendation feed item 400 may take the place of the dismissed card. For example, as shown in FIG. 4C, the card 402-4 may move into the location previously occupied by the card 402-3.

Figure 4D:
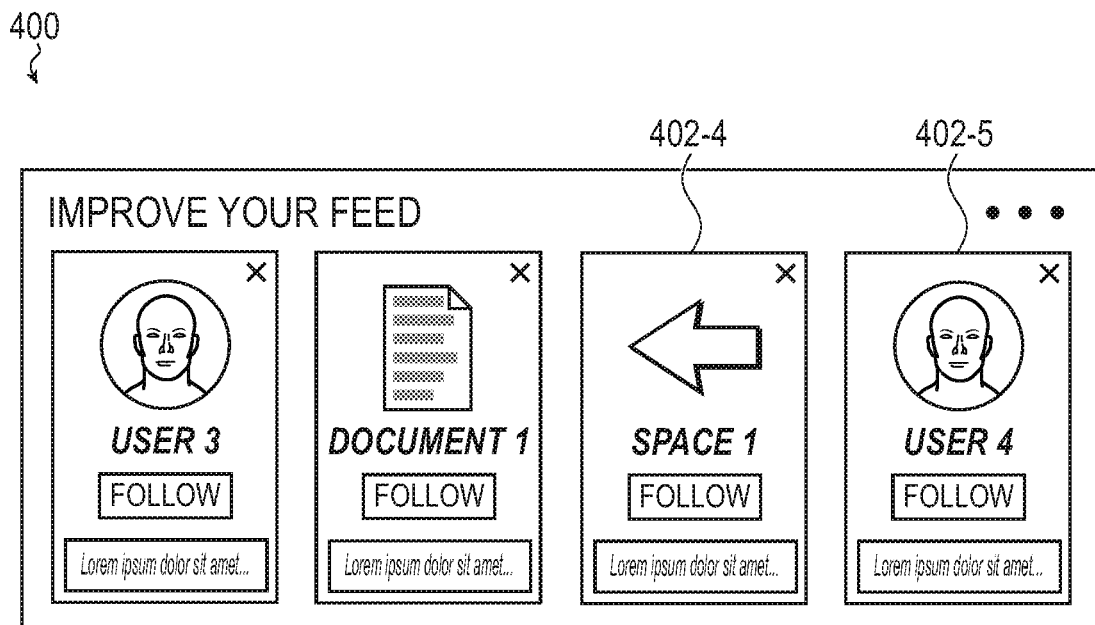

Upon detecting dismissal of a feed item source, the event feed service 110 and/or the feed source recommendation service 111 may determine if there are other feed item source recommendations with confidence values that satisfy a relevancy condition (e.g., indicating that they are likely to be relevant to the receiving user). If there is another feed item source recommendation satisfying the relevancy condition, a card for that feed item source may be displayed in the recommendation feed item 400. FIG. 4D illustrates a card 402-5 recommending another user as a feed item source being displayed in the recommendation feed item 400 in response to another card being dismissed.

In some cases, if no other feed item source recommendations exist that satisfy the confidence condition for relevancy, the dismissed card is not replaced (e.g., no additional card is displayed in the recommendation feed item 400). In this way, the system can avoid providing recommendations that are less relevant, which may cause the user to lose trust in the recommendations and/or otherwise reduce the likelihood that users will improve their event feeds by accepting recommended feed item sources.

As noted above, recommendation feed items may be displayed as a tile in an event feed. FIGS. 5A-5C illustrate examples of an event feed 502 being displayed on a client device 104-1 in graphical user interfaces associated with different software applications and including a recommendation feed item. FIG. 5A, for example, illustrates the event feed 502 being displayed in a graphical user interface 500 associated with a collaborative document system. Specifically, the graphical user interface 500 is directed to particular document space (e.g., "Space 1") of the collaborative document system. The graphical user interface 500 may include a document region 530, a navigation region 520, and an event feed region 506 in which an event feed 502 associated with the user may be displayed. These regions may be the same as or similar to those described with respect to FIG. 2A.

Similar to previous examples provided herein, the navigational region 520 displays expandable hierarchical element trees that include hierarchically arranged elements that correspond to pages, documents, blog entries, or other digital items associated with the space. Specifically, the navigational region 520 includes a document tree or page tree 524 and a blog tree 522 that are collapsible and expandable to reveal selectable elements. As described previously, in response to user selection of an element in the navigational region 520, content of the respective page, document, blog, or other digital item is displayed in the content region 530. Also similar to previous examples, the GUI 500 may be transitioned or changed from a view mode to an edit mode, in accordance with the user having at least edit permissions with respect to the currently displayed or active digital item. The edit mode allows the content region 530 to operate as an editor in which users can add text, images, links, or other user generated content for the active digital item. When complete, the user may publish and/or save the user-generated content, which will be stored as part of the digital item and may be visible to other users with permission to view the respective digital items of the document space.

FIG. 5A illustrates the event feed 502 when the receiving user (e.g., the user of the client device 104-1, for whom the event feed 502 is uniquely generated) has reached the end of the event feed. If the event feed 502 contains more feed items (e.g., tiles) than can be displayed in the event feed region 506, the end may have been reached due to the user scrolling to the end of the feed.

When it is determined (e.g., by the event feed service 110 and/or the feed source recommendation service 111) that the end of an event feed 502 has been reached, a recommendation feed item 504-4 may be displayed in the event feed 502. More particularly, an event feed 502 may include a finite number of feed items, as generated and/or selected by the event feed service 110 for a given event feed instance. (The event feed may be replenished by the event feed service 110, such as when more events that trigger feed items occur.) The end of the event feed 502 may correspond to the user having scrolled to and/or past a last feed item of the event feed 502. When it is detected (e.g., by the client device 104-1, the event feed service 110, or any other suitable device, application, program, or service in the networked computer system 100), the event feed service 110 and/or the feed recommendation service 111 may generate a recommendation feed item 504-4, as described herein, and cause the recommendation feed item 504-4 to be included in the event feed 502 after a last tile (e.g., after the feed item 504-4).

When the end of the event feed 502 is reached, the event feed service 110 and/or the feed recommendation service 111 may only provide a recommendation feed item if there are a sufficient amount of feed item source recommendations that satisfy a first confidence condition, and a sufficient amount of feed item source recommendations that satisfy a second, higher confidence condition. For example, the event feed service 110 and/or the feed recommendation service 111 may analyze a set of feed item sources each having a confidence value indicating a confidence that a candidate feed item source is relevant to a user. The event feed service 110 and/or the feed recommendation service 111 selects, as the set of candidate feed item sources, the feed item sources that satisfy a recommendation criterion for a recommendation metric (e.g., minimum confidence value, qualifying user-to-source classifier, or other metric). In an example, confidence values may range from 0 to 100 (with lower values indicating lower confidence in the relevance of a candidate feed item source), though other ranges are also possible. The first confidence condition, which may indicate a minimum level of relevance to warrant recommending it to a user, may be zero, 10, 20, or another suitable value. In some cases, if there is not a threshold amount of candidate feed item sources (e.g., at least 4 candidate feed item sources), the feed recommendation service 111 will not generate a recommendation feed item to be provided to the user.

The feed recommendation service 111 may also determine whether there are a threshold amount of feed item sources having a confidence value or other recommendation metric that satisfies a second criteria for the given recommendation metric (where the second criteria is higher or more restrictive than the first or initial criteria). Thus, for example, of the candidate feed item sources (which were selected because they satisfied the first confidence condition indicating a minimum level of relevance), the feed recommendation service 111 determines whether there is a sufficient amount of high-confidence recommendations (e.g., candidate feed item sources with confidence values that satisfy the second, higher threshold). As noted above, confidence values may range from 0 to 100 (with lower values indicating lower confidence in the relevance of a candidate feed item source). In this example, the second confidence condition may be a confidence value of 50 or higher, or 75 or higher, or 80 or higher, or another suitable value.

In some cases, if there is not a threshold amount of candidate feed item sources that satisfy the second criteria (e.g., feed item sources that are very likely to be relevant to the user) the feed recommendation service 111 will not generate a recommendation feed item to be provided to the user. More particularly, in some cases, no recommendation feed item will be displayed if there is not at least one feed item source with a high confidence value.

If there are both a threshold amount of feed item sources satisfying the first criteria and a threshold amount of feed item sources satisfying the second criteria, the feed recommendation service 111 may generate a recommendation feed item with at least one of the feed item sources that satisfies the second criteria. In some cases, the threshold amount of feed item sources that satisfy the first criteria is based on the amount of feed item source cards that can be displayed in a recommendation feed item. For example, the recommendation feed item 504-4 can display up to four cards. Accordingly, the feed recommendation service 111 may determine that no recommendation feed item should be displayed unless there are at least four feed item sources that satisfy the first criteria.

The threshold amount of feed item sources that must satisfy the second confidence condition may ensure that at least one recommended feed item source is highly relevant to the user. The threshold amount may be one, or another suitable value (e.g., 2, 3, 4).

FIG. 5B illustrates the event feed 502 after a user has selected one of the recommended feed item sources from the recommendation feed item 504-4. For example, the user of the client may have selected to follow "Space 1" by selecting the selectable element (e.g., the follow button) in that card in the recommendation feed item 504-4. In response, the user becomes subscribed to or otherwise follows events that occur with respect to that space.

Either upon selection of the card, or in response to a page refresh or other condition, the event feed service 110 may cause a feed item 504-5 that is associated with "Space 1" to be displayed to the user in the event feed 502. For example, feed item 504-5 indicates that User 4 has edited the weekly meeting notes associated with Space 1. As a result of this space-related event and the fact that user has selected to subscribe or follow "Space 1," the feed item 504-5 is generated and displayed in the user's feed 502 as shown in feed region 506.

As noted above, the feed item source recommendations that are included in a recommendation feed item may be customized based on the graphical software application that the user is engaging with. FIG. 5C illustrates the event feed 502 being displayed in a graphical user interface 510 associated with an issue tracking system, illustrating how both the event feed and the recommendation feed item may differ as compared to the presentation in the collaborative document system in FIG. 5A. The graphical user interface 510 may include an issue ticket region 513 (including representations of issue tickets 515), a navigation region 511, and an event feed region 516 in which an event feed 502 associated with the user may be displayed. These regions may be the same as or similar to those described with respect to FIG. 2B.

Because the event feed 502 is being displayed in the GUI 510 of the issue tracking system, the order of feed items in the event feed 502 may differ as compared to the order when the event feed 502 is displayed in a GUI of a different software system. For example, as shown in FIG. 5B, the feed items 504 are shown in a different order as compared to FIG. 5A. Additionally, the contents of the recommendation feed item 504-5 may differ due to the feed item 504-5 being displayed in the context of the GUI 510. For example, the recommendation feed item 504-5 may include cards associated with feed item sources that are more relevant to the issue tracking system and/or to issue tickets that the user is viewing and/or engaged with.

Figure 6A:
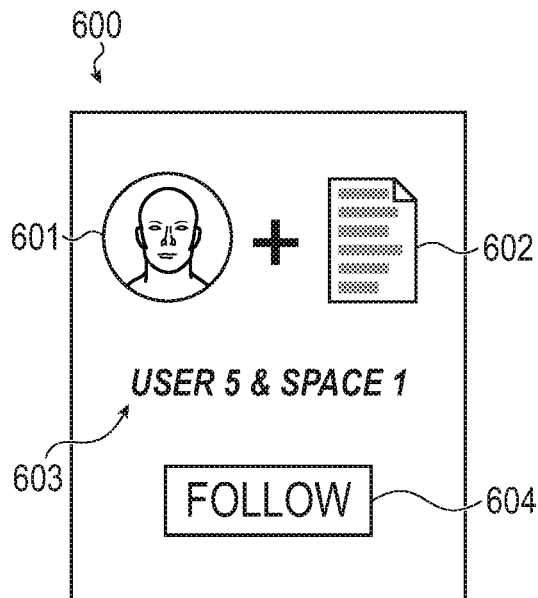
FIGS. 6A-6D depict example recommendation cards representing feed item sources for inclusion in a recommendation feed item, as described herein.
Figure 6B:
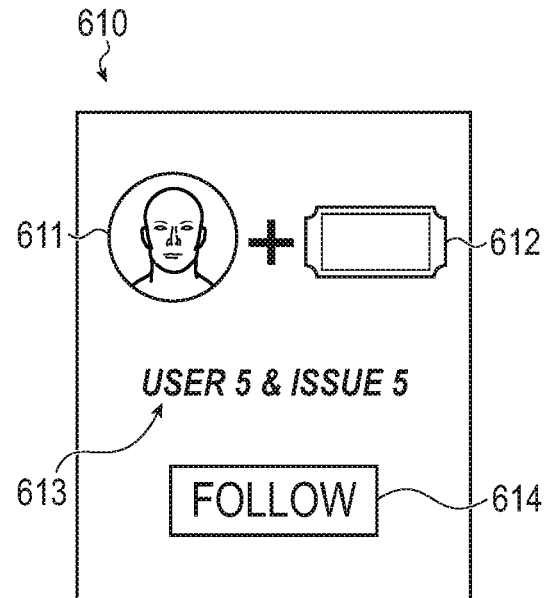
Figure 6C:
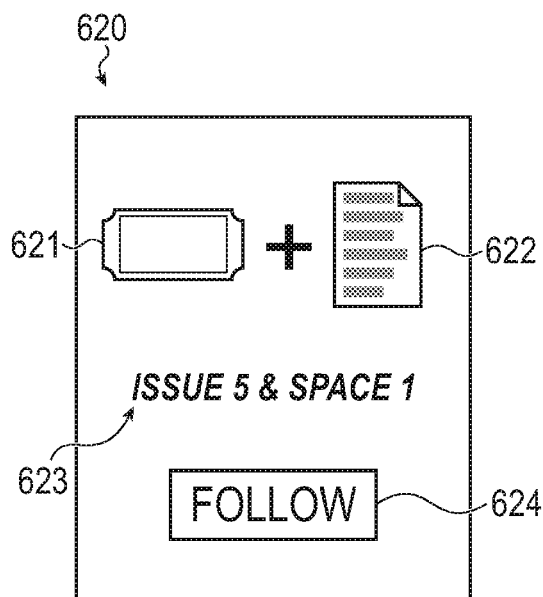

In some cases, cards in a recommendation feed item tile may be associated with a single feed item source, and a selection of that card may cause the user to follow or subscribe to that single feed item source. FIGS. 6A-6C illustrate examples of cards in which a user may, with a single input, follow or subscribe to multiple feed item sources. The feed recommendation service 111 may identify feed item sources that may be relevant together, and present them in a single card. For example, the feed recommendation service 111 may determine that a particular document space (or document) and a particular user would both be relevant to another individual for similar reasons (e.g., they are both associated with the same project). In such cases, those feed item sources may be presented together in a single card. In some cases, the feed recommendation service 111 is configured to determine the relevancy or other recommendation metric of feed item sources to users. One of the outputs of this process may be a reason (or reasons) for the finding of relevance. Such reasons may include, without limitation, commonality between users who have engaged with content, commonality between content items, links (e.g., hyperlinks) between content, or the like. Thus, when feed item sources are identified that are relevant for the same or overlapping reasons, the feed recommendation service 111 may combine them together as shown.

FIG. 6A, for example, shows an example card 600 in which the feed item sources being recommended include a user and a document space. The card 600 may include graphics 601 and 602 representing the feed item sources and illustrating the types of the feed item sources that are being recommended, as well as titles 603 or other identifiers of the recommended feed item sources. The card 600 may also include a selectable element 604 that, when selected by a user, causes the user to subscribe to or follow both the feed item sources in the card 600.

FIG. 6B shows an example card 610 in which the feed item sources being recommended include a user and an issue ticket. The card 610 may include graphics 611 and 612 representing the feed item sources and illustrating the types of the feed item sources that are being recommended, as well as titles 613 or other identifiers of the recommended feed item sources. The card 610 may also include a selectable element 614 that, when selected by a user, causes the user to subscribe to or follow both the feed item sources in the card 610.

FIG. 6C shows an example card 620 in which the feed item sources being recommended include an issue ticket and a document space. The card 620 may include graphics 621 and 622 representing the feed item sources and illustrating the types of the feed item sources that are being recommended, as well as titles 623 or other identifiers of the recommended feed item sources. The card 620 may also include a selectable element 624 that, when selected by a user, causes the user to subscribe to or follow both the feed item sources in the card 620.

Figure 6D:
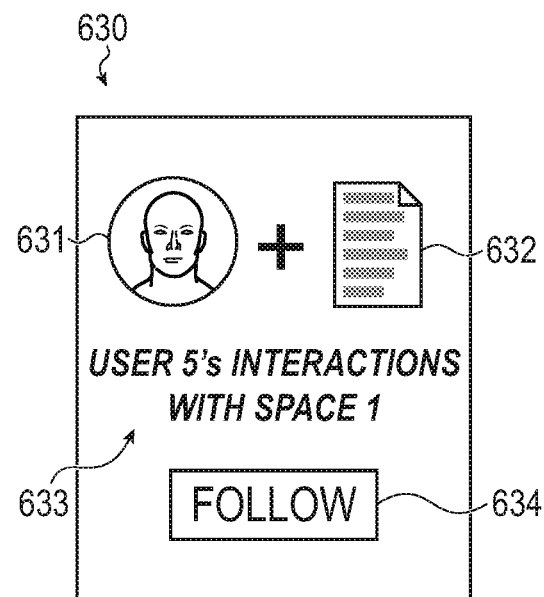

FIG. 6D shows an example card 630 in which a feed item source is a single source, but the source is based on interactions between a user and content. For example, feed items may be generated in response to interactions between a user and content associated with a document space. This type of feed item source may be useful where the user (e.g., user 5) or the document (e.g., document 5) independently not be relevant to a receiver of an event feed, but the user's interactions with that particular document space may be relevant. The card 630 may include graphics 631 and 632 representing the entities that define the feed item source (e.g., the user and the content whose interactions will trigger event feed items), as well as titles 633 or other identifiers of the feed item sources. The card 630 may also include a selectable element 634 that, when selected by a user, causes the user to subscribe to or follow the feed item source defined by the interactions between the two entities represented in the card.

Figure 7:
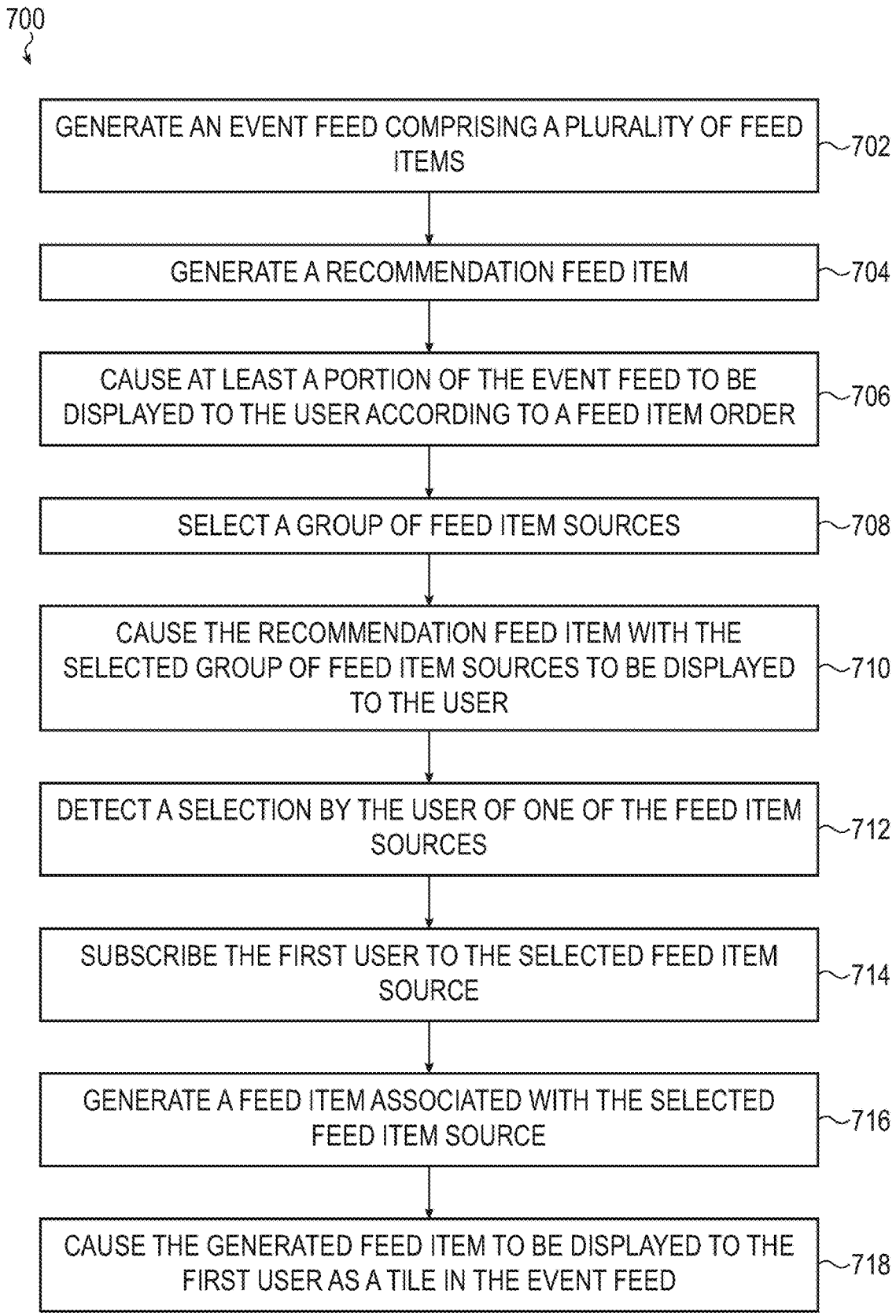
FIG. 7 depicts an example process for recommending feed item sources in an event feed.

FIG. 7 is a flow chart of an example process 700 for recommending feed item sources in an event feed. The process 700 may be performed by devices and/or services of the system 100, including, for example, an application platform 102 and associated event feed service 110 and/or a feed recommendation service 111. The event feed service 110 may be configured to generate an event feed for display to a user, based at least in part on notifications received by the event feed service 110 from one or more software applications 112 (or other content sources).

At operation 702, an event feed service 110 (which may include a feed source recommendation service 111 that performs one or more operations of the process 700), generates an event feed comprising a plurality of feed items associated with a first user. Generating the event feed may include generating a first feed item associated with a feed item source (e.g., an issue associated with one or more issue tickets in an issue tracking system) being followed by the first user. Generating the event feed may further include generating a second feed item associated with a second feed item source (e.g., a user-generated document being followed by the first user and stored in association with a collaborative document system).

At operation 704, the event feed service 110 generates a recommendation feed item comprising one or more feed item sources not being followed by the first user. The recommendation feed item may be generated in response to detecting that the first user has reached an end of the event feed (as described with respect to FIGS. 5A-5C). The recommendation feed item may be displayed separately (e.g., as a separate tile) from other feed items in the event feed. The recommendation feed item may include selectable elements associated with multiple different feed item sources (and multiple different types of feed item sources). In some cases, representations of each feed item source (of multiple feed item sources in the recommendation feed item) are positioned in the recommendation feed item tile, with each representation positioned at a different location in the recommendation feed item tile. FIG. 4A, for example, depicts a recommendation feed item tile 400 with representations of multiple feed item sources (e.g., cards 402) positioned in the tile.

At operation 706, the event feed service 110 causes at least a portion of the event feed to be displayed to the first user according to a feed item order, the feed item order based on the particular graphical user interface (and/or software application) in which the event feed is being viewed. For example, the feed item order may be a first feed item order if the first user is viewing a graphical user interface associated with an issue tracking system, and a second (different) feed item order if the first user is viewing a graphical user interface associated with a collaborative document system. In some cases, instead of or in addition to the event feeds being displayed with a different feed item order, the display of the event feed differs in other ways when it is displayed in different graphical user interfaces.

At operation 708, the event feed service 110 selects, as the one or more feed item sources, a group of feed item sources, the selection based on the particular graphical user interface in which the event feed is being viewed. For example, if the first user is viewing a graphical user interface associated with an issue tracking system, the one or more feed item sources may include a first group of feed item sources, and if the first user is viewing a graphical user interface associated with a collaborative document system, the one or more feed item sources may include a second, different group of feed item sources. The group of feed item sources may include a first feed item source and a second feed item source, where the first feed item source is a user-generated document associated with the collaborative document system, and the second feed item source is an issue ticket associated with the issue tracking system. The group of feed item sources may further include a third feed item source that is a second user different from the first user.

At operation 710, the event feed service 110 causes the recommendation feed item with the selected group of feed item sources to be displayed to the user. Once the recommendation feed item is displayed, the event feed service 110 may detect a selection of one of the one or more feed item sources in the recommendation feed item, generate a third feed item associated with the selected feed item source, and cause the third feed item to be displayed to the first user in the event feed.

At operation 712, the event feed service 110 detects a selection by the first user of one of the feed item sources. For example, the first user may click on or otherwise select one of the feed item sources in the recommendation feed item.

At operation 714, the event feed service 110 subscribes the first user to the selected feed item source. Subscribing the first user to the selected feed item source may include causing the event feed service 110 to begin including feed items from the selected feed item source in the first user's event feed. For example, the event feed service 110 may generate a feed item in response to receiving notifications of events that occur with respect to the selected feed item source.

At operation 716, the event feed service 110 generates a fourth feed item associated with the selected feed item source. For example, the event feed service 110 may receive a notification of an event related to the selected feed item source (e.g., an issue ticket, a user-generated document, a second user, or the like), and, in response, generate a feed item for display to the first user in the user's event feed.

At operation 718, the event feed service 110 causes the generated feed item associated with the selected feed item source to be displayed to the first user (e.g., as a tile in the event feed). The generated feed item may be displayed immediately or shortly after the feed item source is selected, or at a later time, such as a next time the event feed is displayed, or upon a page or event feed refresh event, or in response to another triggering event.

Figure 8:
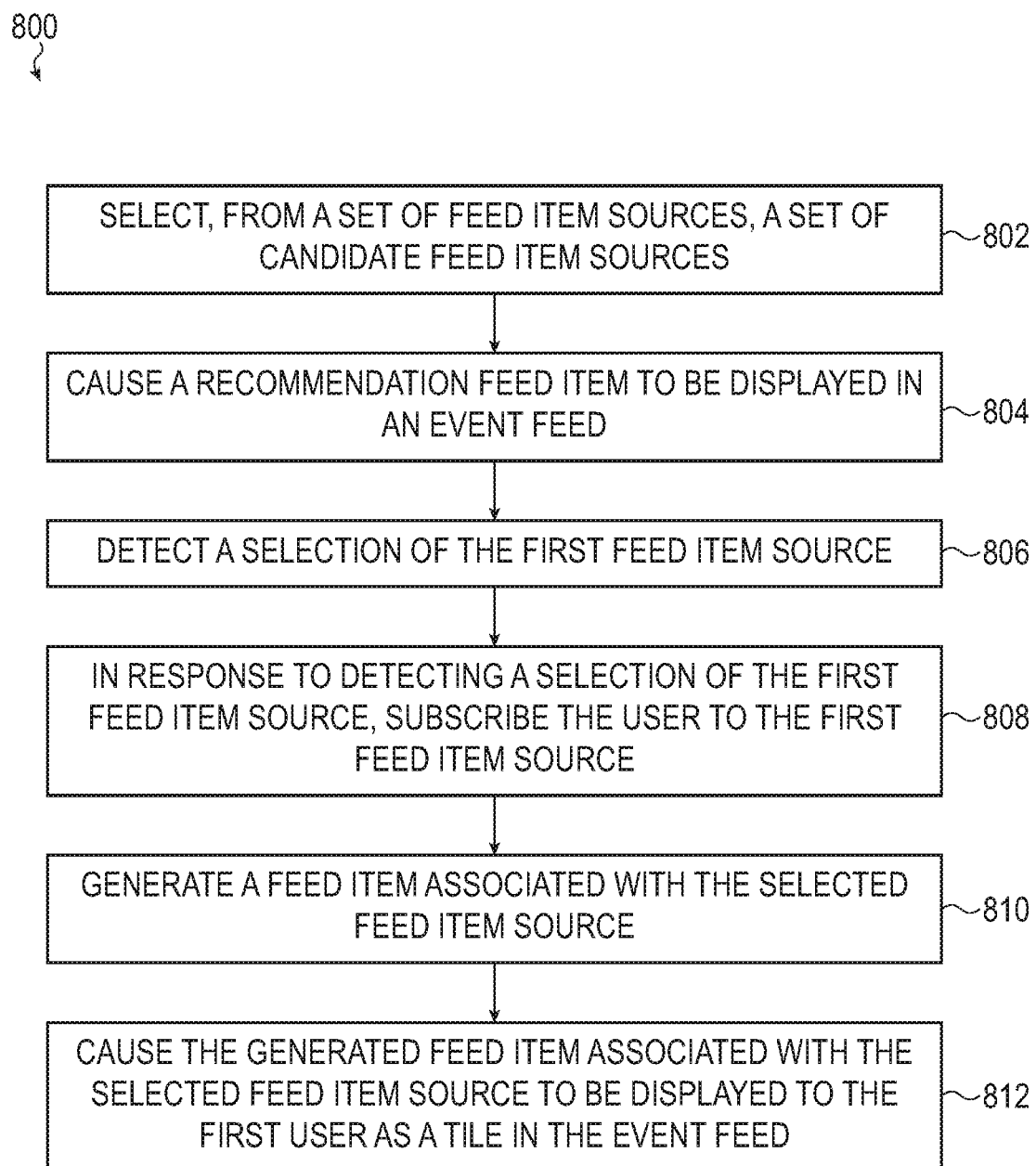
FIG. 8 depicts another example process for recommending feed item sources in an event feed.

FIG. 8 is a flow chart of an example process 800 for recommending feed sources in an event feed. The process 800 may be performed by devices and/or services of the system 100, including, for example, an application platform 102 and associated event feed service 110 and/or a feed recommendation service 111. The event feed service 110 may be configured to generate an event feed for display to a user, based at least in part on notifications received by the event feed service 110 from one or more software applications 112 (or other content sources).

At operation 802, the event feed service 110 selects, from a set of feed item sources, a set of candidate feed item sources, each respective selected feed item source having a respective recommendation metric (e.g., classifier or relevancy) that satisfies a condition or criteria. The feed item sources in the set of feed item sources may include document spaces, system users, issues stored in association with an issue tracking system, user-generated documents stored in association with a collaborative document system, and/or other digital items of at least one of the issue tracking system or the collaborative document system.

The recommendation metric may indicate a probability or likelihood the a candidate feed item source is relevant to the particular user. In one example, the system determines a user-to-source classifier, which maybe based on historical interactions between the user and respective feed source. As discussed previously, the classifier may be constructed using stored or previously receive user interaction events and/or an interaction log of user interactions with the system. The events may be classified or sorted by interaction event type and used to construct a classifier vector having a set of vector elements. Each element may correspond to a type of interaction and may represent an aggregated amount of activity of the respective type. For a user-to-space classifier, for example, a first vector element may correspond to a number of pages created by the user within the recommended space. A second vector element may correspond to a number of updates performed to the set of documents of the recommended space by the user. A third vector element may correspond to a number of mentions of the user within the recommended space or other feedback associated with the user. A fourth vector element may correspond to a number of pages viewed by the user within the recommended space over a threshold amount of viewing time (e.g., a specified minimum dwell time).

In some implementations, the classifier (e.g., the multi-element vector) weighted in order to improve the accuracy of the recommendation by emphasizing some types of interactions with respect to other types of interactions. In one example, the user-to-space classifier is based on a weighted event vector which is computed by weighting each vector element of the event vector. The weighted event vector may include a first weighted element determined by applying a first weight factor to the first vector element of the event vector, a second weighted element determined by applying a second weight factor to the second vector element of the event vector, a third weighted element determined by applying a third weight factor to the third vector element of the event vector, a fourth weighted element determined by applying a fourth weight factor to the fourth vector element of the event vector, and so on. The relative weight may be determined in accordance with the type of activity. For example, the first weight factor associated with content creation interactions may have the greatest relative weight as compared to the other weight factors. The second weight factor associated with update, edits, or other modifications of content may have the second greatest relative weight as compared to other weight factors. Weight factors corresponding to user feedback activity or user mentions and page viewing interactions may have lower relative weight factors, respectively, as compared to the other weight factors. In some cases, the classifier is provided to a machine-learning trained model that provides an output that indicates a recommendation for the classifier. In some cases, the recommendation is binary (e.g., recommend or not recommend) and in other cases the recommendation is a score or value that can be compared to other recommendation scores or values in order to rank or order recommended feed sources.

At operation 804, in accordance with a determination that the set of candidate feed item sources includes a threshold amount of candidate feed item sources and at least a first feed item source having a confidence value that satisfies a second confidence condition, the event feed service 110 causes a recommendation feed item to be displayed in an event feed. The recommendation feed item may include a first selectable element associated with the first feed item source and a second selectable element associated with a second feed item source from the candidate feed item sources At operation 806, the event feed service 110 detects a selection of the first feed item source. For example, the first user may click on or otherwise select the first selectable element associated with the first feed item source.

At operation 808, in response to detecting a selection of the first feed item source, the event feed service 110 subscribes the user to the first feed item source. Subscribing the user to the first feed item source may include causing the event feed service 110 to begin including feed items from the first feed item source in the user's event feed. For example, the event feed service 110 may generate a feed item in response to receiving notifications of events that occur with respect to the first feed item source.

In response to detecting the selection of the first feed item source, the event feed service 110 may also cause the first card to cease to be displayed and cause a third card to be displayed in the recommendation feed item, the third card including a third selectable element associated with a third feed item source from the candidate feed item sources. Thus, for example, another feed item source may be recommended to the user once the selected feed item source is removed from the recommendation feed item.

At operation 810 the event feed service 110 generates a feed item associated with the selected feed item source. For example, the event feed service 110 may receive a notification of an event related to the selected feed item source (e.g., an issue ticket, a user-generated document, a second user, or the like), and, in response, generate a feed item for display to the first user in the user's event feed.

At operation 812, the event feed service 110 causes the generated feed item associated with the selected feed item source to be displayed to the first user (e.g., as a tile in the event feed). The generated feed item may be displayed immediately or shortly after the feed item source is selected, or at a later time, such as a next time the event feed is displayed, or upon a page or event feed refresh event, or in response to another triggering event.

Figure 9:
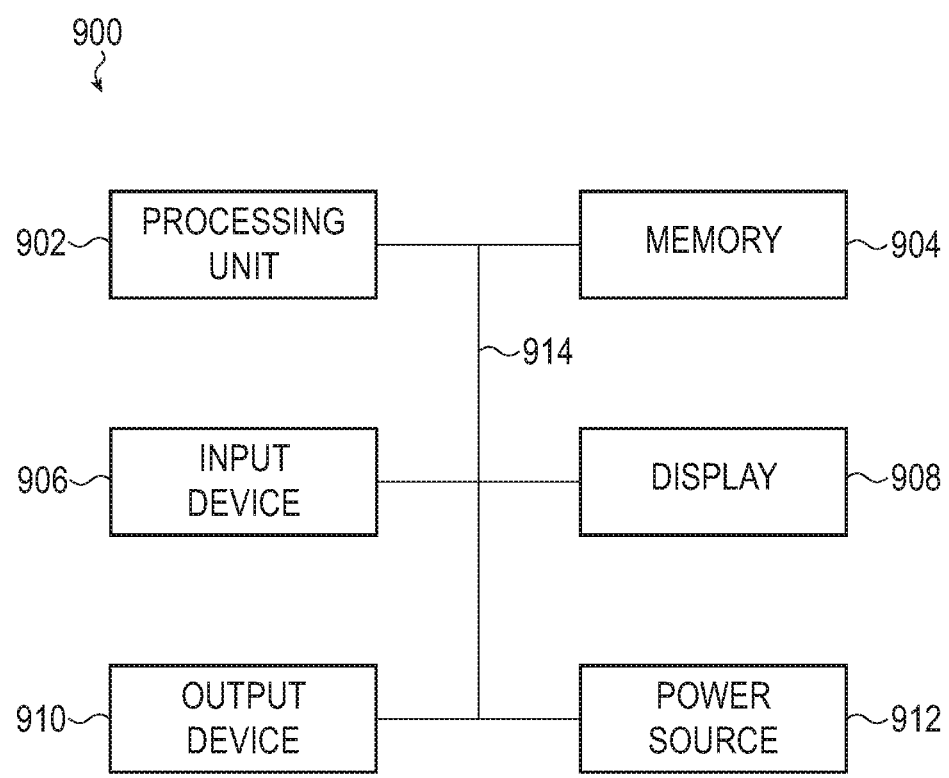
FIG. 9 depicts an example electrical block diagram of an electronic device that may perform the operations described herein.

FIG. 9 illustrates a sample electrical block diagram of an electronic device 900 that may perform the operations described herein. The electronic device 900 may in some cases take the form of any of the electronic devices described with reference to FIGS. 1A-6D, including client devices 104 and/or servers or other computing devices associated with the networked computer system 100 (e.g., the application platform 102, the event feed service 110, software applications 112, third party content sources 108, etc.). The electronic device 900 can include one or more of a display 908, a processing unit 902, a power source 912, a memory 904 or storage device, input devices 906, and output devices 910. In some cases, various implementations of the electronic device 900 may lack some or all of these components and/or include additional or alternative components.

The processing unit 902 can control some or all of the operations of the electronic device 900. The processing unit 902 can communicate, either directly or indirectly, with some or all of the components of the electronic device 900. For example, a system bus or other communication mechanism 916 can provide communication between the processing unit 902, the power source 912, the memory 904, the input device(s) 906, and the output device(s) 910.

The processing unit 902 can be implemented as any electronic device capable of processing, receiving, or transmitting data or instructions. For example, the processing unit 902 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 900 can be controlled by multiple processing units. For example, select components of the electronic device 900 (e.g., an input device 906) may be controlled by a first processing unit and other components of the electronic device 900 (e.g., the display 908) may be controlled by a second processing unit, where the first and second processing units may or may not be in communication with each other.

The power source 912 can be implemented with any device capable of providing energy to the electronic device 900. For example, the power source 912 may be one or more batteries or rechargeable batteries. Additionally or alternatively, the power source 912 can be a power connector or power cord that connects the electronic device 900 to another power source, such as a wall outlet.

The memory 904 can store electronic data that can be used by the electronic device 900. For example, the memory 904 can store electronic data or content such as, for example, audio and video files, documents and applications, device settings and user preferences, timing signals, control signals, and data structures or databases. The memory 904 can be configured as any type of memory. By way of example only, the memory 904 can be implemented as random access memory, read-only memory, Flash memory, removable memory, other types of storage elements, or combinations of such devices.

In various embodiments, the display 908 provides a graphical output, for example associated with an operating system, user interface, and/or applications of the electronic device 900 (e.g., a graphical user interface associated with a collaborative document system, which may include graphical elements related to delivering document template recommendations, displaying documents, displaying document templates from which documents may be generated, displaying a workspace and/or document hierarchy, etc.). In one embodiment, the display 908 includes one or more sensors and is configured as a touch-sensitive (e.g., single-touch, multi-touch) and/or force-sensitive display to receive inputs from a user. For example, the display 908 may be integrated with a touch sensor (e.g., a capacitive touch sensor) and/or a force sensor to provide a touch- and/or force-sensitive display. The display 908 is operably coupled to the processing unit 902 of the electronic device 900.

The display 908 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 908 is positioned beneath and viewable through a cover that forms at least a portion of an enclosure of the electronic device 900.

In various embodiments, the input devices 906 may include any suitable components for detecting inputs. Examples of input devices 906 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 906 may be configured to detect one or more particular types of input and provide a signal (e.g., an input signal) corresponding to the detected input. The signal may be provided, for example, to the processing unit 902.

As discussed above, in some cases, the input device(s) 906 include a touch sensor (e.g., a capacitive touch sensor)

integrated with the display 908 to provide a touch-sensitive display. Similarly, in some cases, the input device(s) 906 include a force sensor (e.g., a capacitive force sensor) integrated with the display 908 to provide a force-sensitive display.

The output devices 910 may include any suitable components for providing outputs. Examples of output devices 910 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 910 may be configured to receive one or more signals (e.g., an output signal provided by the processing unit 902) and provide an output corresponding to the signal.

In some cases, input devices 906 and output devices 910 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 902 may be operably coupled to the input devices 906 and the output devices 910. The processing unit 902 may be adapted to exchange signals with the input devices 906 and the output devices 910. For example, the processing unit 902 may receive an input signal from an input device 906 that corresponds to an input detected by the input device 906. The processing unit 902 may interpret the received input signal to determine whether to provide and/or change one or more outputs in response to the input signal. The processing unit 902 may then send an output signal to one or more of the output devices 910, to provide and/or change outputs as appropriate.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method for recommending feed sources in an event feed, the computer-implemented method comprising:
   at an event feed service in communication with a collaborative document system:
   generating an event feed comprising a plurality of feed items associated with a first user, including:
   generating a first feed item associated with a user-generated document being followed by the first user, the user-generated document stored by the collaborative document system;
   generating a second feed item associated with a second user followed by the first user; and
   generating a recommendation feed item comprising one or more feed item sources not being followed by the first user, the recommendation feed item including a recommendation to follow a recommended document space managed by the collaborative document system, the recommended document space selected from a group of multiple document spaces managed by the collaborative document system based on a user-to-space classifier computed based on past interactions between the user and the recommended document space, the each space of the group of multiple document spaces comprising:
   a set of documents having a first hierarchical relationship to each other defined by a document tree;
   a set of blog posts having a second hierarchical relationship to each other defined by a blog tree; and
   a space administrator identifying a user account for the recommended space, the user account granted permission to determine a set of permissions for the set of documents and the set of blog posts with respect to users of the collaborative document system.

2. The computer-implemented method of claim 1, wherein:
   the collaborative document system is configured to cause display of the event feed in a graphical user interface on a client device;
   the first feed item is displayed as a first tile in the graphical user interface;
   the second feed item is displayed as a second tile in the graphical user interface; and
   the recommendation feed item is displayed as a third tile in the graphical user interface, the third tile includes a space recommendation card that corresponds to the recommended document space; and
   in response to a user selection of the space recommendation card, the event feed service is configured to generate space-based feed items in response to selected events occurring with respect to the recommended space.

3. The computer-implemented method of claim 2, wherein the selected events include:
   an addition of a calendar item to the recommended space;
   an addition of an administrator to the recommended space; and
   an update to a document of the set of documents of the recommended space.

4. The computer-implemented method of claim 1, wherein:
   the user-to-space classifier is based, at least in part, on an event vector comprising a set of vector elements comprising:
   a first vector element corresponding to a number of pages created by the user within the recommended space;
   a second vector element corresponding to a number of updates performed to the set of documents of the recommended space by the user;
   a third vector element corresponding to a number of mentions of the user within the recommended space; and
   a fourth vector element corresponding to a number of pages viewed by the user within the recommended space over a threshold amount of viewing time.

43

5. The computer-implemented method of claim 4, wherein:
the user-to-space classifier is based, at least in part, on weighted event vector which is computed by weighting each vector element of the event vector;
the weighted event vector comprises:
a first weighted element determined by applying a first weight factor to the first vector element of the event vector;
a second weighted element determined by applying a second weight factor to the second vector element of the event vector;
a third weighted element determined by applying a third weight factor to the third vector element of the event vector; and
a fourth weighted element determined by applying a fourth weight factor to the fourth vector element of the event vector.

6. The method of claim 5, wherein:
the first weight factor is greater than the second, third and fourth weight factors; and
the second weight factor is greater than the third and fourth weight factors.

7. The computer-implemented method of claim 1, wherein:
the recommended document space is selected based on an output from a recommendation model; and
the user-to-space classifier is provided to the recommendation model as an input.

8. The computer-implemented method of claim 7, wherein:
the recommendation model is trained using a training set comprising:
a first data set comprising a set of user-to-space classifiers;
a second data set comprising a set of document spaces, each user-to-space classifier of the set of user-to space classifiers correspond to a respective document space of the set of document spaces.

9. A computer-implemented method of generating a recommended feed item for an event feed, the computer-implemented method comprising:
determine a first user-to-space classifier for a first user account and a first document space, the first user-to-space classifier based on a first set of user interaction events with respect to the first user account and the first document space;
determine a second user-to-space classifier for the first user account and a second document space, the second user-to-space classifier based on a second set of user interactions events with respect to a second user account and the second document space;
in response to the first user-to-space classifier satisfying a classifier criteria, generate a first recommendation feed item including a recommendation to follow the first document space;
in response to the second user-to-space classifier satisfying the classifier criteria, generate a second recommendation feed item including a recommendation to follow the second document space;
at an event feed service in communication with a collaborative document system, generate the event feed comprising a plurality of feed items including:
a first feed item associated with a first user-generated document being followed by the first user account;
a second feed item associated with the second user account followed by the first user account; and

44 a recommendation feed item comprising one or more of the first recommendation feed item or the second recommendation feed item;
cause display of the event feed in a graphical user interface of a client device associated with the first user account.

10. The computer-implemented method of claim 9, wherein:
the event feed service is in communication with an issue tracking system that is separate from the collaborative document system; and
the plurality of feed items further comprises a third feed item associated with an issue being followed by the first user account, the issue associated with an issue ticket in the issue tracking system.

11. The computer-implemented method of claim 9, wherein:
the first user-to-space classifier is based, at least in part, on an event vector comprising a set of vector elements comprising:
a first vector element corresponding to a number of pages created by the first user account within the first document space; and
a second vector element corresponding to a number of updates performed to a set of documents of the first document space by the first user account.

12. The computer-implemented method of claim 9, wherein:
the first user-to-space classifier is based, at least in part, on weighted event vector which is computed by weighting each vector element of the event vector;
the weighted event vector comprises:
a first weighted element determined by applying a first weight factor to a first vector element of the event vector;
a second weighted element determined by applying a second weight factor to a second vector element of the event vector.

13. The computer-implemented method of claim 12, wherein the first weight factor is greater than the second weight factor.

14. The computer-implemented method of claim 9, wherein:
the first feed item is displayed as a first tile in the graphical user interface;
the second feed item is displayed as a second tile in the graphical user interface; and
the recommendation feed item is displayed as a third tile in the graphical user interface, the third tile includes a space recommendation card that corresponds to either the first recommendation feed item or the second recommendation feed item; and
in response to a user selection of the space recommendation card, the event feed service is configured to subscribe the first user account to events generated by a respective one of the first document space or the second document space.

15. The computer-implemented method of claim 14, wherein:
in response to the user selection of the space recommendation card, the event feed service is configured to subscribe the first user account to events generated by an account associated with a space administrator of the respective one of the first document space or the second document space.

16. A feed-recommendation service executing on a host server, the feed recommendation service comprising computer-executable instructions that when executed by the host server are configured to cause the host server to:
  determine a user-to-space classifier for a user account and a first document space, the user-to-space classifier based on a set of user interaction events with respect to the user account and the first document space, the set of user interaction events comprising:
    page creation events within the first document space by a user associated with the user account;
    page update events within the first document space by the user associated with the user account; and
    page view events for pages within the first document space viewed by the user associated with the user account;
  in accordance with the user-to-space classifier satisfying a space recommendation criteria, generate a space recommendation card for an event feed;
  determine a relevance condition of a page with respect to the user account, the page belonging to a second document space different than the first document space;
  in accordance with the relevance condition satisfying a relevance criteria, generate a page recommendation card for the event feed; and
  cause display of a recommendation tile in a graphical user interface of a client device associated with the user account, the recommendation tile including the space recommendation card and the page recommendation card.

17. The feed-recommendation service of claim 16, wherein:
  the first and second document spaces are provided by a collaborative document system;
  the feed-recommendation service is in communication with an issue tracking system that is separate from the collaborative document system;
  the relevance condition is a first relevance condition;
  the relevance criteria is a first relevance criteria; and
  the computer-executable instructions are further configured to cause the host server to:
    determine a second relevance condition of a issue of the issue tracking system with respect to the user account; and
    in accordance with the second relevance condition satisfying a second relevance criteria, generate an issue recommendation card for the event feed.

18. The feed-recommendation service of claim 16, wherein:
  the user account is a first user account; and
  the computer-executable instructions are further configured to cause the host server to:
    identify a second user account associated with the first document space; and
    generate a user recommendation card for the event feed.

19. The feed-recommendation service of claim 16, wherein:
  the first document space comprises:
    a first set of documents including a first page having a first hierarchical relationship to each other defined by a first document tree;
    a first set of blog posts having a second hierarchical relationship to each other defined by a first blog tree; and
    a first space administrator identifying a first administrator user account, the first administrator user account having permission to determine permissions for the first set of documents and the first set of blog posts; and
  the second document space comprises:
    a second set of documents including a second page having a third hierarchical relationship to each other defined by a second document tree, the second set of documents different than the first set of documents;
    a second set of blog posts having a fourth hierarchical relationship to each other defined by a second blog tree, the second set of blog posts different than the first set of blog posts; and
    a second space administrator identifying a second administrator user account, the second administrator user account having permission to determine permissions for the second set of documents and the second set of blog posts.

20. The feed-recommendation service of claim 16, wherein:
  in response to a user selection of the space recommendation card, an event feed service is configured to generate space-based feed items in response to selected events occurring with respect to the first document space; and
  the selected events include:
    a new page added to the first document space;
    an addition of a calendar item to a calendar of the first document space; and
    an update to a page of the first document space.

\* \* \* \* \*